United States Patent
Nutter

(10) Patent No.: US 10,662,929 B2
(45) Date of Patent: May 26, 2020

(54) THERMAL TRANSPIRATION GENERATOR SYSTEM

(71) Applicant: Engineering Manufacturing Contractors, LLC, Newark, OH (US)

(72) Inventor: Mark Eugene Nutter, Newark, OH (US)

(73) Assignee: Engineering Manufacturing Contractors, LLC, Newark, OH (US)

( * ) Notice: Subject to any disclaimer, the term of this patent is extended or adjusted under 35 U.S.C. 154(b) by 32 days.

(21) Appl. No.: 15/766,607

(22) PCT Filed: Dec. 7, 2016

(86) PCT No.: PCT/US2016/065377
§ 371 (c)(1),
(2) Date: Apr. 6, 2018

(87) PCT Pub. No.: WO2017/063001
PCT Pub. Date: Apr. 13, 2017

(65) Prior Publication Data
US 2018/0298884 A1 Oct. 18, 2018

Related U.S. Application Data

(63) Continuation of application No. 14/878,767, filed on Oct. 8, 2015, now abandoned, which is a continuation
(Continued)

(51) Int. Cl.
*F03G 6/04* (2006.01)
*F03G 6/06* (2006.01)
(Continued)

(52) U.S. Cl.
CPC ............... *F03G 6/04* (2013.01); *F03G 6/06* (2013.01); *F03G 7/00* (2013.01); *F24S 23/30* (2018.05);
(Continued)

(58) Field of Classification Search
CPC ..... F03G 6/00; F03G 6/04; F03G 6/06; F03G 7/00; Y02E 10/46; F24S 23/31; F24S 40/55; F24S 40/57; F24S 23/30
See application file for complete search history.

(56) References Cited

U.S. PATENT DOCUMENTS 3,715,885 A * 2/1973 Schur ...................... F03B 17/02
60/496
4,353,003 A * 10/1982 Sommers .................. F03G 6/00
310/306
(Continued)

FOREIGN PATENT DOCUMENTS

GB 2060781 A * 5/1981 ............. F03D 9/007

*Primary Examiner* — Mark A Laurenzi
*Assistant Examiner* — Xiaoting Hu
(74) *Attorney, Agent, or Firm* — Porter, Wright, Morris & Arthur, LLP

(57) ABSTRACT

A system includes a thermal transpiration generator having a vacuum-sealed container, a rotatable shaft within the container, bearings supporting the shaft within the container, a first set of vanes secured to the shaft, a second set of vanes secured to the shaft, a first receiving lens for focusing energy on the first set of vanes, a second receiving lens for focusing energy on the second set of vanes, and a flywheel secured to the shaft. An electric generator is located outside the container and is coupled to the rotatable shaft with a magnetic coupler to be driven by rotation of the shaft. The system further includes a light energy collector system concentrating energy on each of the first and second receiving lenses, and an outer housing located about the container and the electric generator.

21 Claims, 16 Drawing Sheets

Related U.S. Application Data of application No. 14/288,253, filed on May 27, 2014, now abandoned.

(60) Provisional application No. 61/827,342, filed on May 24, 2013.

(51) Int. Cl.
*F03G 7/00* (2006.01)
*F24S 23/71* (2018.01)
*F24S 30/425* (2018.01)
*F24S 23/30* (2018.01)
*F24S 23/79* (2018.01)

(52) U.S. Cl.
CPC ................ *F24S 23/71* (2018.05); *F24S 23/79* (2018.05); *F24S 30/425* (2018.05); *Y02E 10/46* (2013.01)

(56) References Cited

U.S. PATENT DOCUMENTS

| | | | | |
|---|---|---|---|---|
| 6,062,029 A * | 5/2000 | Doe | ......................... | F03G 6/065 60/641.15 |
| 2003/0110767 A1* | 6/2003 | Lee | ..................... | F03B 13/1815 60/495 |
| 2011/0073149 A1* | 3/2011 | Ladner | .................... | H01L 35/30 136/200 |
| 2012/0204564 A1* | 8/2012 | Battaglia | ................... | F03G 7/00 60/641.8 |
| 2014/0174086 A1* | 6/2014 | Kare | ...................... | F01K 11/00 60/670 |
| 2016/0126393 A1* | 5/2016 | Chatterjee | .............. | H02S 20/30 136/246 |
| 2018/0026578 A1* | 1/2018 | Hu | .......................... | G02B 5/10 136/246 |

* cited by examiner

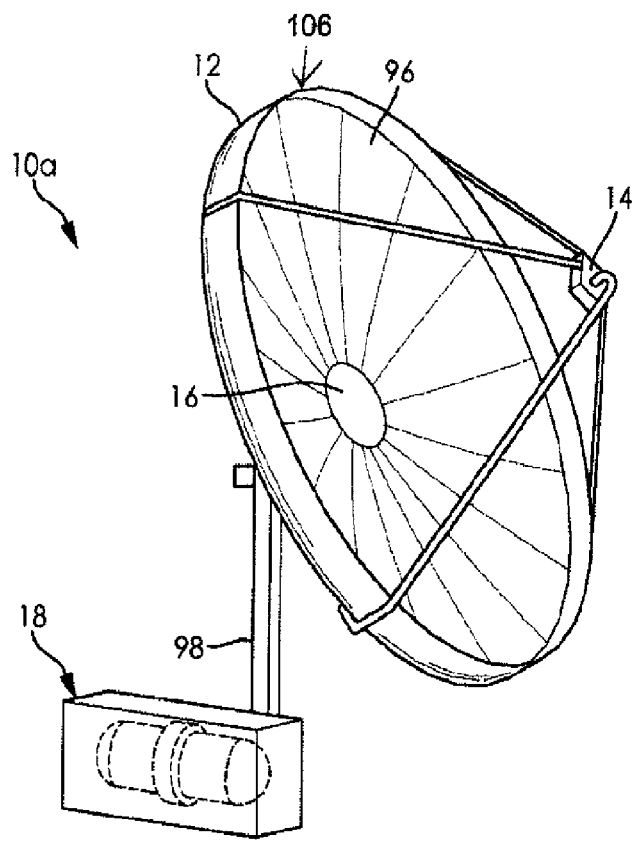
FIG. 6
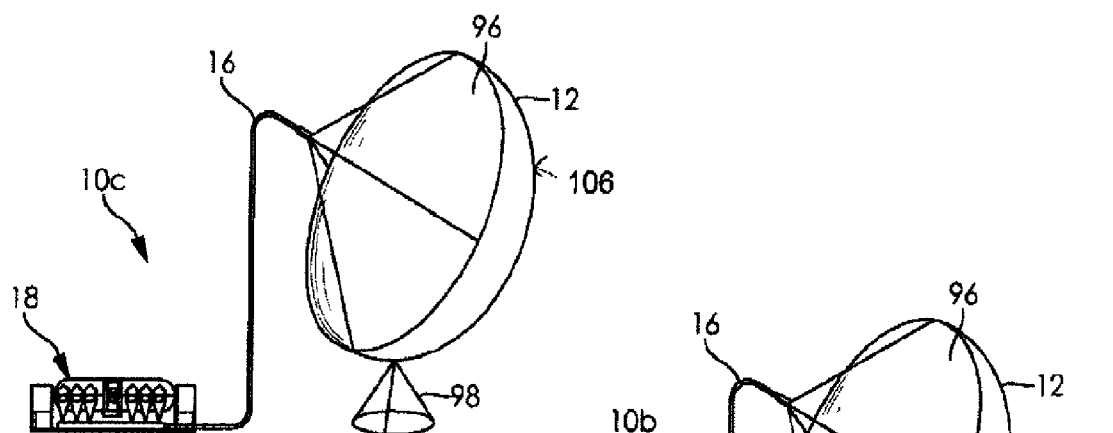
FIG. 7
FIG. 8

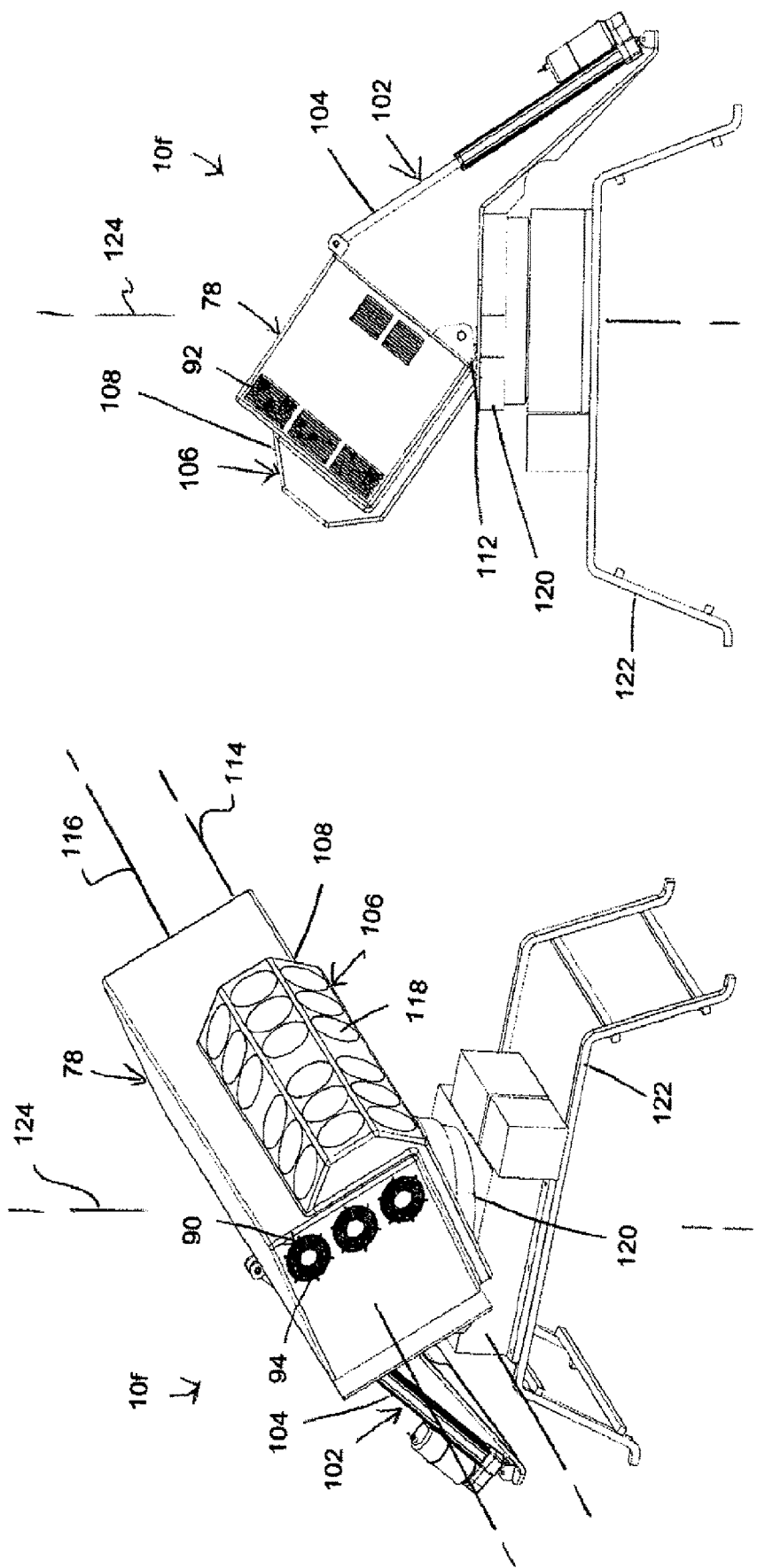

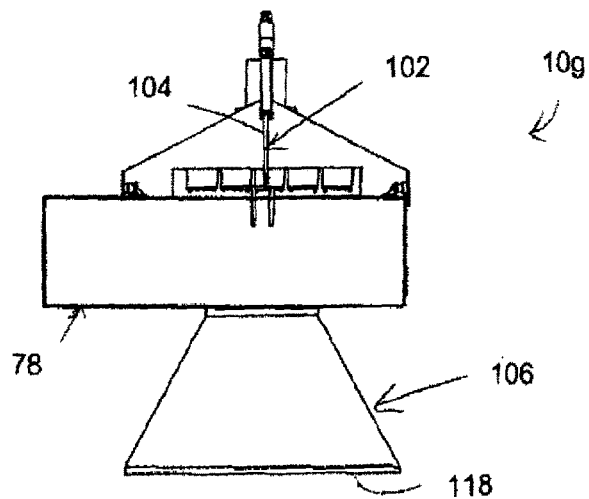
FIG. 27
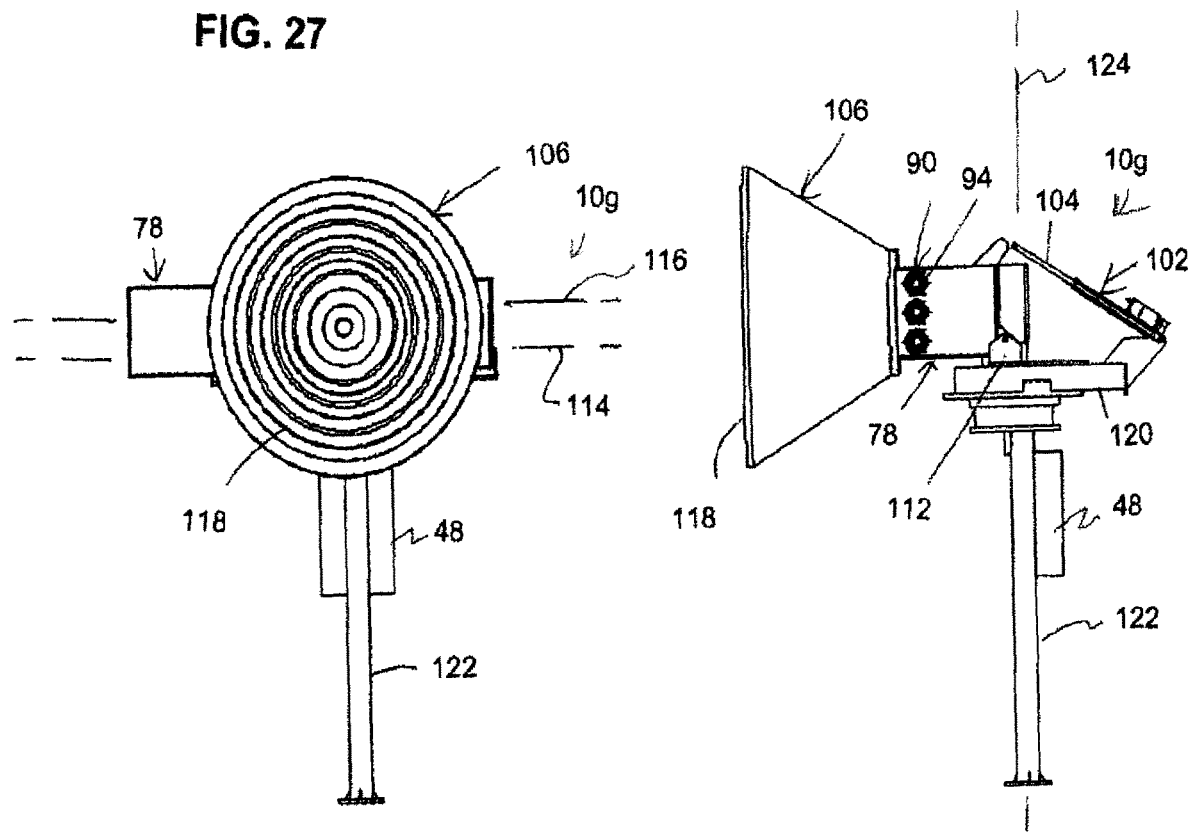
FIG. 28
FIG. 29

THERMAL TRANSPIRATION GENERATOR SYSTEM

FIELD OF THE INVENTION

The field of the present invention generally relates to power generation systems and, more particularly, to power generation systems using solar energy to generate electricity.

BACKGROUND OF THE INVENTION

Currently, electric generators typically require fuels that render them expensive to operate. Some gasoline and steam powered generators are also noisy and can generate undesirable exhaust gases. Additionally, the generators that require gasoline or other carbon-based fuels have undesirable time restrictions and output limitations. Batteries can be used as back-ups but the electric generators still only operate under a limited time due to battery life, and usually are limited in overall capacity. As a result alternative energy powered generators such as solar powered generators have been developed. However, current solar powered generators require an extensive amount of area for solar panels to obtain desired power output levels and are quite expensive.

Thermal transpiration generators or radiometers (aka solar engines or Crookes Radiometers) are known. Such generators exploit the physical phenomena known as thermal transpiration wherein a thermal gradient at the edge of a rotating vane having opposed light reflecting and light absorbing surfaces causes a rarefied or low density gas to slip across the gradient from the cold side to the hot side thereby effecting motion of the vane. While these generators have shown that they are capable of generating some electricity in a laboratory environment, they have yet to produce desired levels of electricity with compact systems.

Accordingly, there is a need for improved thermal transpiration generator systems and methods.

SUMMARY OF THE INVENTION

Disclosed are thermal transpiration generator systems and methods which address one or more issues of the related art. Disclosed is a thermal transpiration generator system comprising, in combination, a thermal transpiration generator comprising a vacuum-sealed container, a rotatable shaft disposed within the vacuum-sealed container, bearings supporting the rotatable shaft within the vacuum-sealed container, a first set of at least two vanes located in the vacuum-sealed container and secured to the rotatable shaft for rotation therewith, a second set of at least two vanes located in the vacuum-sealed container and secured to the rotatable shaft for rotation therewith and spaced-apart from the first set of at least two vanes along the length of the rotatable shaft, wherein each of the vanes has a light reflecting side and an opposite light absorbing side, a first receiving lens for focusing energy on the light absorbing sides of the first set of at least two vanes, and a second receiving lens for focusing energy on the light absorbing sides of the second set of at least two vanes. The thermal transpiration generator system further comprises an electric generator operatively coupled to the rotatable shaft to be driven by rotation of the rotatable shaft, and a light energy collector system concentrating energy on each of the first and second receiving lenses.

Also disclosed is a thermal transpiration generator system comprising, in combination, a thermal transpiration generator comprising a vacuum-sealed container, a rotatable shaft disposed within the vacuum-sealed container, bearings supporting the rotatable shaft within the vacuum-sealed container, a first set of at least two vanes located in the vacuum-sealed container and secured to the rotatable shaft for rotation therewith, a second set of at least two vanes located in the vacuum-sealed container and secured to the rotatable shaft for rotation therewith and spaced-apart from the first set of at least two vanes along the length of the rotatable shaft, wherein each of the vanes has a light reflecting side and an opposite light absorbing side, a first receiving lens for focusing energy on the light absorbing sides of the first set of at least two vanes, a second receiving lens for focusing energy on the light absorbing sides of the second set of at least two vanes, and at least one high RPM flywheel secured to the rotatable shaft for rotation therewith. An electric generator is located outside the vacuum-sealed container and is coupled to the rotatable shaft with a magnetic coupler to be driven by rotation of the rotatable shaft. The thermal transpiration generator system further comprises a light energy collector system concentrating energy on each of the first and second receiving lenses.

Also disclosed is a thermal transpiration generator system comprising, in combination, a thermal transpiration generator comprising a vacuum-sealed container, a rotatable shaft disposed within the vacuum-sealed container, frictionless bearings supporting the rotatable shaft within the vacuum-sealed container, a first set of at least two vanes located in the vacuum-sealed container and secured to the rotatable shaft for rotation therewith, a second set of at least two vanes located within the vacuum-sealed container and secured to the rotatable shaft for rotation therewith and spaced-apart from the first set of at least two vanes along the length of the rotatable shaft, wherein each of the vanes has a light reflecting side and an opposite light absorbing side, a first receiving lens for focusing energy on the light absorbing sides of the first set of at least two vanes, a second receiving lens for focusing energy on the light absorbing sides of the second set of at least two vanes, and at least one high RPM flywheel secured to the rotatable shaft for rotation therewith. A low torque and high RPM electric generator is located outside the vacuum-sealed container and is coupled to the rotatable shaft with a magnetic coupler to be driven by rotation of the rotatable shaft. The thermal transpiration generator system further comprises a light energy collector system concentrating energy on each of the first and second receiving lenses, and an outer housing located about the vacuum-sealed container and the electric generator and at least partly supporting the light energy collector system.

Also disclosed is a thermal transpiration generator system comprising, in combination, a thermal transpiration generator comprising a vacuum-sealed container, a rotatable shaft disposed within the vacuum-sealed container, bearings supporting the rotatable shaft within the vacuum-sealed container, a first set of at least two vanes located inside the vacuum-sealed container and secured to the rotatable shaft for rotation therewith, a second set of at least two vanes located inside the vacuum-sealed container and secured to the rotatable shaft for rotation therewith and spaced-apart from the first set of at least two vanes along the length of the rotatable shaft, wherein each of the vanes has a light reflecting side and an opposite light absorbing side, a first receiving lens located to focus energy on the light absorbing sides of the first set of at least two vanes, and a second receiving lens located to focus energy on the light absorbing sides of the second set of at least two vanes. An electric generator is operatively coupled to the rotatable shaft to be driven by rotation of the rotatable shaft. Cooling bands encircle the vacuum-sealed container for cooling the interior of the vacuum sealed container. The thermal transpiration generator system further comprising light energy collector system concentrating energy to the first and second receiving lenses, an outer housing located about the vacuum-sealed container and the electric generator and at least partly supporting the light energy collector system, and at least one cooling fan for cooling the interior of the outer housing. The thermal transpiration generator is configured to be alternatively mounted in a vertical orientation wherein the shafted is vertically extending and a horizontal orientation wherein the shaft is horizontally extending.

From the foregoing disclosure and the following more detailed description of various preferred embodiments it will be apparent to those skilled in the art that the present invention provides a significant advance in the technology and art of thermal transpiration generator systems and methods. Particularly significant in this regard is the potential the invention affords for providing relatively compact and versatile thermal transpiration generator systems and methods which greatly improve electrical output from relatively small sized systems. Additional features and advantages of various preferred embodiments will be better understood in view of the detailed description provided below.

BRIEF DESCRIPTION OF THE DRAWINGS

These and further features of the present invention will be apparent with reference to the following description and drawings.

FIG. 6 is a perspective view of a thermal transpiration generator system according to a second embodiment of the present invention.

FIG. 7 is a perspective view of a thermal transpiration generator system according to a third embodiment of the present invention.

FIG. 8 is a perspective view of a thermal transpiration generator system according to a fourth embodiment of the present invention.

FIG. 14 is a perspective view of a thermal transpiration generator system according to a seventh embodiment of the present invention.

FIG. 15 is an end elevational view of the thermal transpiration generator system of FIG. 14, wherein the thermal transpiration generator is horizontally mounted on a rotational drive and lift cylinder.

FIG. 27 is a top plan view of a thermal transpiration generator system according to an eighth embodiment of the present invention, showing a very large Fresnel lens used to focus sunlight onto a light distribution system, which then focuses the light energy onto the respective vanes, and the thermal transpiration generator is horizontally mounted on a rotational drive and elevating lift cylinder that optimally presents the Fresnel lens to the sun by following the path of the sun.

FIG. 28 is a front elevational view of the thermal transpiration generator system of FIG. 27.

FIG. 29 is a left side elevational view of the thermal transpiration generator system of FIGS. 27 and 28.

Figure 1:
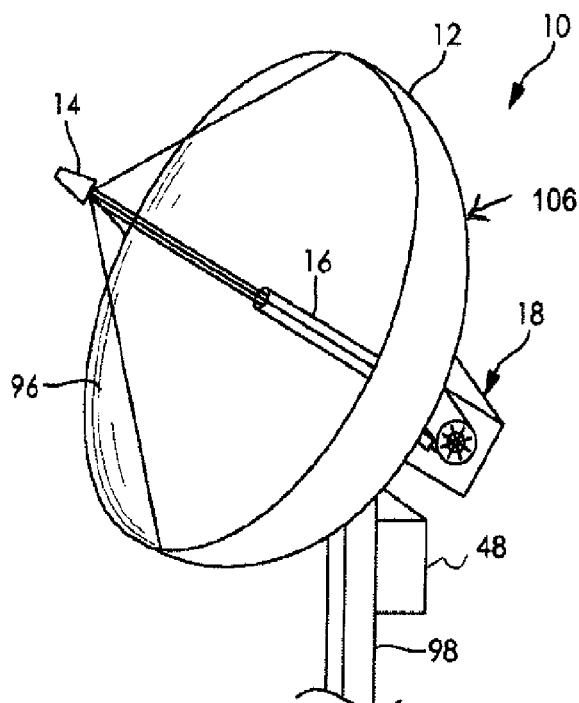
FIG. 1 is a front perspective view of a thermal transpiration generator system according to a first embodiment of the present invention.
Figure 2:
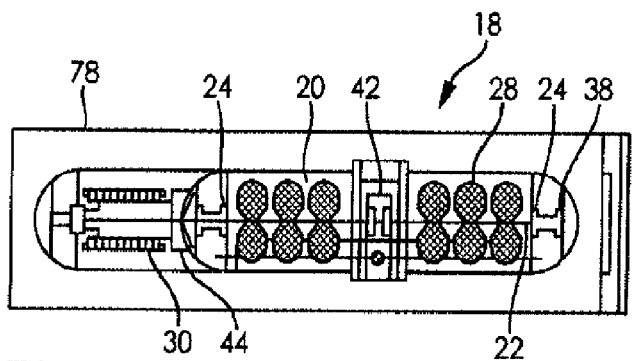
FIG. 2 is a rear elevational view of a thermal transpiration generator of the thermal transpiration generator system of FIG. 1.
Figure 3:
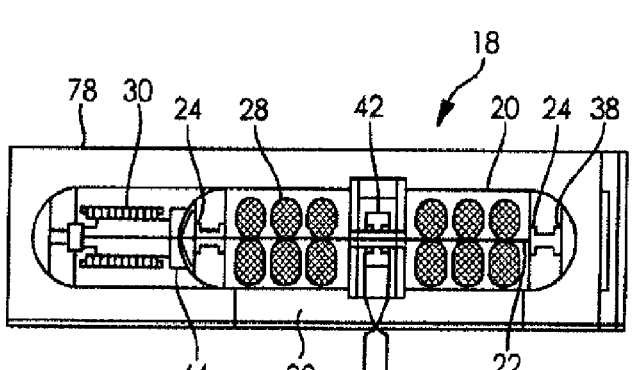
FIG. 3 is a top plan view of the thermal transpiration generator of FIGS. 1 and 2.
Figure 4:
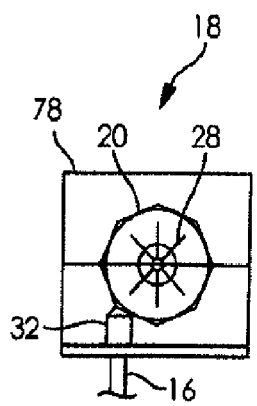
FIG. 4 is a left end elevational view of the thermal transpiration generator of FIGS. 1 to 3.
Figure 5:
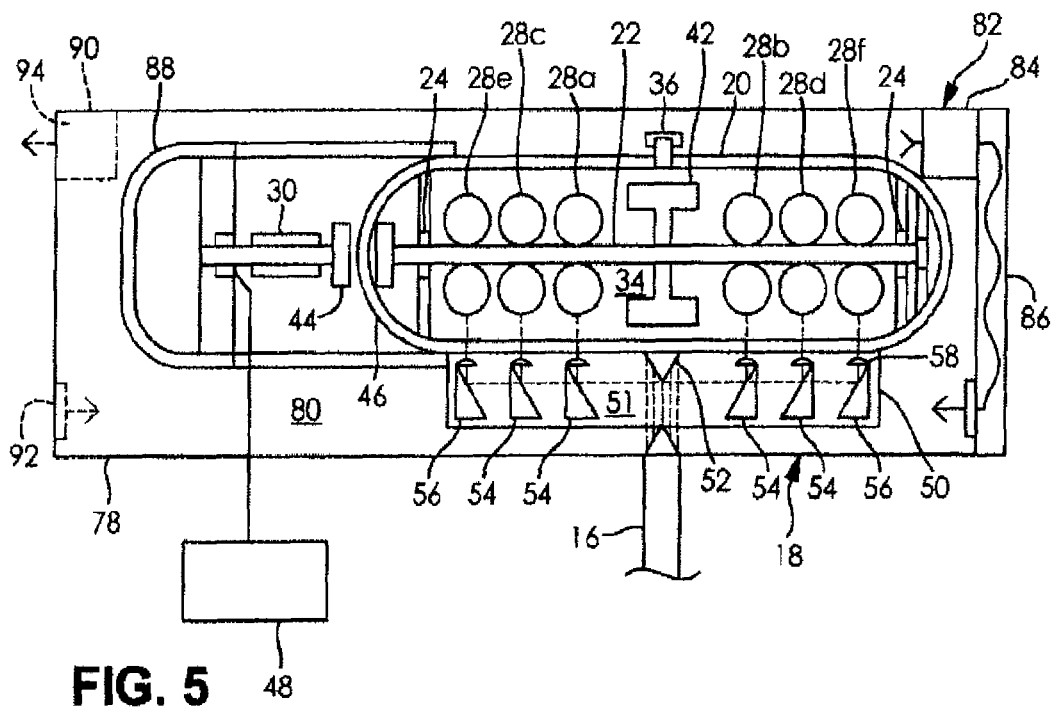
FIG. 5 is a diagrammatic view of the thermal transpiration generator of FIGS. 1 to 4.

It should be understood that the appended drawings are not necessarily to scale, presenting a somewhat simplified representation of various preferred features illustrative of the basic principles of the invention. The specific design features of the thermal transpiration generator systems as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the covers for portable electronic devices illustrated in the drawings. In general, up or upward generally refers to an upward direction within the plane of the paper in FIG. 1 and down or downward generally refers to a downward direction within the plane of the paper in FIG. 1. Also in general, front or forward generally refers to a direction toward the right within the plane of the paper in FIG. 1 and rear or rearward generally refers to a direction toward the left within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the thermal transpiration systems disclosed herein. The following detailed discussion of various alternative and preferred embodiments will illustrate the general principles of the invention. However, other embodiments suitable for other applications will be apparent to those skilled in the art given the benefit of this disclosure.

Referring now to the drawings, FIGS. 1 to 5 show a thermal transpiration generator system 10 according to a first embodiment of the present invention. The illustrated thermal transpiration generator system 10 includes a parabolic dish 12, a secondary reflector 14 receiving solar energy from the parabolic dish 12, and a carrier tube 16 directing solar energy from the parabolic dish 12 to a thermal transpiration device or generator 18. The illustrated thermal transpiration device or generator 18 includes a vacuum-sealed container 20, a rotatable shaft 22 within the vacuum-sealed container 20, bearings 24 rotatably supporting the rotatable shaft 22, at least two sets of at least two vanes 28 secured to the rotatable shaft 22 for rotation therewith and spaced-apart along the length of the shaft, an alternator or electric generator 30 operatively coupled to the rotatable shaft 22 to be driven by rotation of the rotatable shaft 22, and a solar energy distribution system 32 for receiving solar energy from the carrier tube 16 and directing light to each of the at least two sets of vanes 28, to rotate the at least two sets of vanes 28 and the shaft 22 to drive the electric generator 30. The illustrated thermal transpiration generator 18 includes a first set of vanes 28a, a second set of vanes 28b, a third set of vanes 28c, a fourth set of vanes 28d, a fifth set of vanes 28e, and a sixth set of vanes 28f, but any other suitable plurality of sets of vanes can alternatively be utilized.

Thermal transpiration generation is a physical process of converting rarefied gas flow into electrical energy. The illustrated thermal transpiration generator system utilizes the sun's energy to turn the at least two sets of vanes 28, the shaft 22, and the alternator or electric generator 30 to generate AC or DC power. The illustrated thermal transpiration generator system 10 can be used to power home residences, charge batteries of all types, and power various commercial facilities. The illustrated thermal transpiration generator system's size and shape, vane design, generator size and output, and added features to enhance the product's performance can be varied to deliver the necessary power requirements to fulfill various electrical markets as described in more detail hereinafter.

The illustrated vacuum-sealed container 20 is generally cylindrical-shaped having rounded ends and is horizontally disposed. It is noted that the vacuum-sealed container 20 can alternatively have any other suitable shape and/or orientation. The vacuum-sealed container 20 forms a sealed hollow interior space 34 suitable for holding the rotatable shaft 22 and other components as described in more detail hereinafter. The vacuum-sealed container 20 is configured to hold an inert gas such as, for example, helium, argon, or the like at a vacuum or near vacuum pressure level. The vacuum-sealed container 20 is preferably filled with a suitable inert gas (volume and type) to maximize turning performance of the at least two sets of vanes 28. The vacuum-sealed container 20 can be formed of any suitable material such as for example, Pyrex, stainless steel, aluminum alloy, or the like. If the material of the vacuum-sealed container 20 does not permit passage of the desired solar energy therethrough to the at least two sets of vanes 28, such as when metallic, the vacuum-sealed container 20 is provided with adequate windows for passage of the solar energy therethrough to the at least two sets of vanes 28. The illustrated vacuum-sealed container 20 is hermetically sealed and has a single port 36 for inert gas insertion to fill the vacuum-sealed container 20 to achieve the optimum vacuum level for optimal system performance. Once filled and hermetically sealed, the desired vacuum level should be maintained in the sealed vacuum-sealed container 20 for the life of the system.

The illustrated rotatable shaft 22 is rotatably supported within the vacuum-sealed container 20 for rotation on its longitudinal axis and is horizontally disposed such that it is generally coaxial with the cylindrical-shaped vacuum-sealed container 20. The illustrated shaft 22 has a length that extends nearly the entire longitudinal length of the interior cavity 34 of the vacuum-sealed container 20 but any other suitable length can alternatively be utilized. The illustrated shaft 22 is configured for high speed rotation of about 10,000 rpm to 100,000 rpm but any other suitable configuration can alternatively be utilized. The illustrated shaft 22 comprises stainless steel but any other suitable material can alternatively be utilized.

The illustrated bearings 24 rotatably support the rotatable shaft 22 within the vacuum-sealed container 20. The illustrated shaft 22 is supported in the vertical direction by a pair of passive frictionless magnet bearings 24. The illustrated passive magnetic bearings 24 are spaced-apart along the length of the shaft 22 near the ends of the shaft 22 and outside the sets of vanes 28. It is noted that any other suitable type of bearings 24 can alternatively be utilized to support the shaft 22 such as, for example, active frictionless magnetic bearings, other types of frictionless bearings or the like. However, it is noted that the passive magnetic bearings 24 are preferred because an electrical feed through in the vacuum container wall is not required to provide power to the bearings 24. As a result, the illustrated vacuum-sealed container 20 can be hermetically sealed. A first end of the illustrated shaft 22 is also provided with a jeweled bearing 38 configured to prevent wobble of the shaft 22. It is noted that alternatively, any other suitable configuration to prevent wobble of the shaft 22 can alternatively be utilized.

The illustrated six sets of vanes 28a, 28b, 28c, 28d, 28e, 28f are secured to the rotatable shaft 22 for rotation therewith and preventing relative motion therebetween. The vanes 28 can be secured to the shaft 22 in any suitable manner. The position of the vanes 28 relative to the shaft 22 is preferably adjustable so that the position of the vanes 28 can be optimized depending on the energy path and energy delivery system along with the vane energy absorption and thrust efficiencies. The illustrated shaft 22 has six sets of vanes 28a, 28b, 28c, 28d, 28e, 28f longitudinally spaced-apart along the length of the shaft 22 but any other suitable plurality of sets of vanes 28a, 28b, 28c, 28d, 28e, 28f can alternatively be utilized. The illustrated sets of vanes 28a, 28b, 28c, 28d, 28e, 28f are divided equally on both sides of a flywheel 42 (described in more detail hereinafter) but it is noted that the sets of vanes 28a, 28b, 28c, 28d, 28e, 28f can alternatively be distributed in any other suitable configuration. Each of the illustrated sets of vanes 28a, 28h, 28e, 28d, 28e, 28f includes eight vanes 28 that radially extend from the shaft 22 and are equally spaced-apart about the circumference of the shaft 22. It is noted that the sets of vanes 28a, 28b, 28c, 28d, 28e, 28f can each alternatively have any other suitable quantity of the vanes 28.

Each of the illustrated vanes 28 is generally oval shaped but can alternatively have any other suitable shape such as, for example, rectangular, circular, triangular, trapezoidal, or the like. The illustrated vanes 28 have flat surfaces but the surfaces can alternatively be convex or concave. The vanes 28 can comprise any suitable material. The illustrated vanes 28 have opposed heat reflecting and heat absorbing sides. The heat reflecting and heat absorbing sides can be formed in any suitable manner such as, for example, white and black paint respectively. The heat absorbing sides are the targets of the solar energy distributed to the vanes 28 by the solar energy distribution assembly 32 as described in more detail hereinafter. The vanes 28 are shaped, sized, and formed a suitable material to optimally receive focused light that creates a pressure difference on each side of the vane 28 (involving higher pressure from faster moving escaped inert gas molecules on the dark absorbing side versus slower moving molecules from the light reflective side) allowing the internal inert gas and the subsequent energy to push the vanes 28.

The illustrated thermal transpiration generator 18 also includes a flywheel 42 secured to the shaft 22 for rotation therewith in order to store mechanical momentive energy. The stored kinetic energy is helpful when the sun is behind a cloud and/or for an initial period of time after the sun sets in the evening. The mass of the illustrated flywheel 42 is designed to travel outward (increase energy) toward the wall of the container 20 based on the rpm of the shaft 22. The illustrated flywheel 42 is a lightweight, high rpm flywheel configured for rotation of about 10,000 rpm to about 100,000 rpm. The flywheel 42 can comprise carbon nanotubes such as, for example, graphene or the like that withstands the high rpm operation without breaking apart but can alternatively comprise any other suitable material that withstands the high rpm operation. The flywheel 42 can be provided with a housing if desired and can also be provided with a liquid filled housing if desired. The illustrated flywheel 42 is centrally located along the shaft 22 and centrally located among the sets of vanes 28a, 28b, 28c, 28d, 28e, 28f, with three sets of vanes 28a, 28b, 28c, 28d, 28e, 28f on each side of the flywheel 42. It is noted that the flywheel 42 can alternatively be located at any other suitable location such as, for example, outside the vacuum-sealed container 20 (as shown in FIG. 8). The flywheel 42 is sized and shaped for mechanical performance to optimize performance of the overall system. It is noted that the flywheel 42 can alternatively have any other suitable configuration.

The illustrated electric alternator or generator 30 is operatively coupled to the rotatable shaft 22 to be driven by rotation of the rotatable shaft 22 to produce electric current. The illustrated electric generator 30 is a low torque, high rpm generator for operation at rotational speeds of about 10,000 rpm to about 100,000 rpm but any other suitable type of electric generator can alternatively be utilized. The illustrated electric generator 30 is located outside the vacuum-sealed container 20 and operatively coupled to the shaft 22 via a magnetic coupler 44 operating through the wall 46 of the vacuum-sealed container 20. It is noted that the electric generator 30 is preferably located outside the vacuum-sealed container 20 because an electrical feed through in the vacuum container wall 46 is not required and that the magnetic coupler 44 is preferred because a shaft feed through in the vacuum container wall 46 is not required. The magnetically coupled drive 44 is engaged and disengaged by a control system 48 based on the accomplished vane/flywheel drive torque and revolutions achieved with the system. The shaft's rotational speed is monitored and the magnetic engagement is controlled by the control system 48. As a result, the illustrated vacuum-sealed container 20 can be hermetically sealed. Thus creating an environment that will not require maintenance to maintain the ideal internal atmospheric condition with regard to optimum amount of inert gas and vacuum requirements to optimize performance of the thermal transpiration generator system 10. The electric alternator or generator 30 can be of any suitable type and more than one electric generator 30 can be utilized such as, for example, there can be an electric generator 30 at each end of the shaft 22 or along the length of the shaft 22.

The illustrated solar or light energy distribution assembly 32 is configured for receiving solar or light energy from the carrier tube 16 and directing light energy to each of the sets of vanes 28a, 28b, 28c, 28d, 28e, 28f. The illustrated solar energy distribution assembly 32 includes a housing 50 forming a hollow interior cavity 51 and secured along the side of the vacuum-sealed container 20. The carrier tube 16 directs solar energy centrally into a side of the housing 50 and perpendicular to the shaft 22 to a prism shaped mirror 52 which within the cavity 51 that directs the solar energy in opposed first and second directions toward ends of the housing 50 and parallel to the shaft 50. In each direction, the solar energy passes through beam splitting prisms 54 which reflect a portion of the solar energy toward the adjacent inner vane sets 28a, 28b, 28c, 28d, and transmit a portion along the same path parallel to the shaft 22. A final reflective prism 56 reflects all the remaining solar energy toward the adjacent outer vane set 28e, 28f. Six receiving lenses 58 are provided, one for each of the sets of vanes 28a, 28b, 28c, 28d, 28e, 28f, which are each configured to focus the solar or light energy on the absorbing side of the adjacent vane 28. The illustrated receiving lenses 58 are Fresnel lenses but it is noted that any other suitable type of lens can alternatively be utilized. The illustrated solar energy distribution assembly 32 evenly distributes the solar or light energy to the sets of vanes 28a, 28b, 28c, 28d, 28e, 28f. The solar energy is disbursed to the absorbing sides of the vanes 28 where energy is absorbed to create a rapidly accelerated atomic energy thrust away from the dark side to rotate the vanes 28 and the shaft 22 connected thereto to operate the electric generator 30. It is noted that the solar or light energy distribution assembly 32 can alternatively have any other suitable configuration.

The illustrated thermal transpiration generator 18 also includes an outer housing or cooling jacket 78 that forms a sealed interior space 80 for the vacuum-sealed container 20, the electric generator 30, and the solar energy distribution assembly 32. The illustrated cooling jacket 78 is provided with a cooling system 82 in the form of a pump 84 and a radiator 86 so that a cooling liquid such as, for example, water, refrigerant, or the like can be circulated from within the interior space 80 of the cooling jacket 78 to the radiator 86 and back into the cooling jacket 78 to keep the thermal transpiration generator 18 at or near ambient temperature. The illustrated electric generator 30 is provided with a sealed housing 88 secured to the sealed vacuum-sealed container 20 to prevent direct contact of the cooling liquid with the electric generator 30. The sealed housing 88 about the electric generator 30 is preferably hermetically sealed. It is noted that the radiator 86 can be replaced so that the cooling liquid is pumped to provide heat energy elsewhere such as, for example, a home hot water heater, swimming pool, or the like. It is also noted that the pump 84 and the radiator 86 can alternatively be replaced with a fan 90 and air inlets and outlets 92, 94 to air cool the thermal transpiration generator 18. It is further noted that the cooling system 82 can have any other suitable configuration or the cooling system 82 can be eliminated if desired.

The illustrated parabolic dish 12 is configured to receive solar energy from the sun at a parabolic shaped reflective surface 96 and reflect it to the secondary reflector 14 secured thereto in a known manner. The parabolic dish 12 preferably has a tracking mechanism that tracks the parabolic dish 12 with the sun so that the parabolic dish 12 is always at an optimum position to receive the solar energy. The parabolic dish 12 can alternatively be configured in any other suitable manner. The secondary reflector 14 receives the solar energy from the parabolic dish 12 and reflects it back in a collimated beam of light toward the carrier tube 16. The secondary reflector 14 can be of any suitable type. The carrier tube 16 receives solar energy from the secondary reflector 14 and carries it to the solar energy distribution assembly 32 of the thermal transpiration device or generator 18. The illustrated carrier tube 16 is located at the center of the parabolic dish 12 and extends through the parabolic dish 12 to the thermal transpiration device or generator 18 which is mounted at the back of the parabolic dish 12 so that it travels with the parabolic dish 12 as the parabolic dish 12 tracks the sun. The carrier tube 16 can be of any suitable type and can alternatively be configured in any other suitable manner. The thermal transpiration generator 18 can alternatively be located in any other suitable location.

The control system 48 is located outside the cooling jacket 78 and can be mounted separately such as, for example, mounted to the support stand or base 98 of the parabolic dish 12. The control system 48 is configured to maintain the most efficient electrical system for powering a number of different auxiliary entities such as, for example, a home, a garage, a battery charging station, a cell phone tower site, or the like. The control system 48 is preferably expandable to allow for such auxiliary systems to be included and preferably has an Internet hook-up so that the software of the control system can be remotely updated as desired. If the system is supplying power to a home, it can include necessary hardware for hook-up to a utility company's power feed to supplement the home power or return power to the utility company when excess power is available. DC to AC inverters may be included to convert DC power from a storage battery charged by the system to AC power for home use.

FIG. 6 shows a thermal transpiration generator system 10a according to a second embodiment of the present invention. This thermal transpiration generator system 10a is substantially the same as the thermal transpiration generator system 10 described above according to the first embodiment of the present invention except that the thermal transpiration device or generator 18 is in a different location. The illustrated transpiration device or generator 18 is located at the base 98 of the parabolic dish 12. This second embodiment of the thermal transpiration generator system 10a illustrates that the thermal transpiration generator 18 can alternatively be located in any other suitable location.

FIG. 7 shows a thermal transpiration generator system 10b according to a third embodiment of the present invention. This thermal transpiration generator system 10b is substantially the same as the thermal transpiration generator system 10a described above according to the second embodiment of the present invention except that the secondary reflector 14 has been eliminated and the parabolic dish 12 reflects the solar energy directly into the carrier tube 16 which has an inlet located at the focal point of the parabolic dish 12 in place of the secondary reflector 14. The illustrated transpiration device or generator 18 is located on the ground below the focal point of the parabolic dish 12 and the carrier tube 16 is in the form of a fiber optic carrying tube or cable. This third embodiment of the thermal transpiration generator system 10b illustrates that the thermal transpiration generator 18 can alternatively be located in any other suitable location and/or the thermal transpiration generator system 10 can alternatively have other suitable configurations.

FIG. 8 shows a thermal transpiration generator system 10c according to a fourth embodiment of the present invention. This thermal transpiration generator system 10c is substantially the same as the thermal transpiration generator system 10b described above according to the third embodiment of the present invention except that the thermal transpiration generator 18 has fewer sets of vanes 28 and the flywheel 42 is located outside the vacuum-sealed container 20. This fourth embodiment of the thermal transpiration generator system 10c illustrates that the thermal transpiration generator 18 can alternatively have other suitable configurations.

Figure 9:
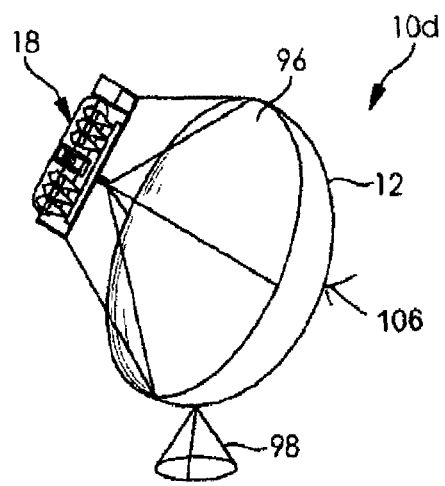
FIG. 9 is a perspective view of a thermal transpiration generator system according to a fifth embodiment of the present invention.
Figure 11:
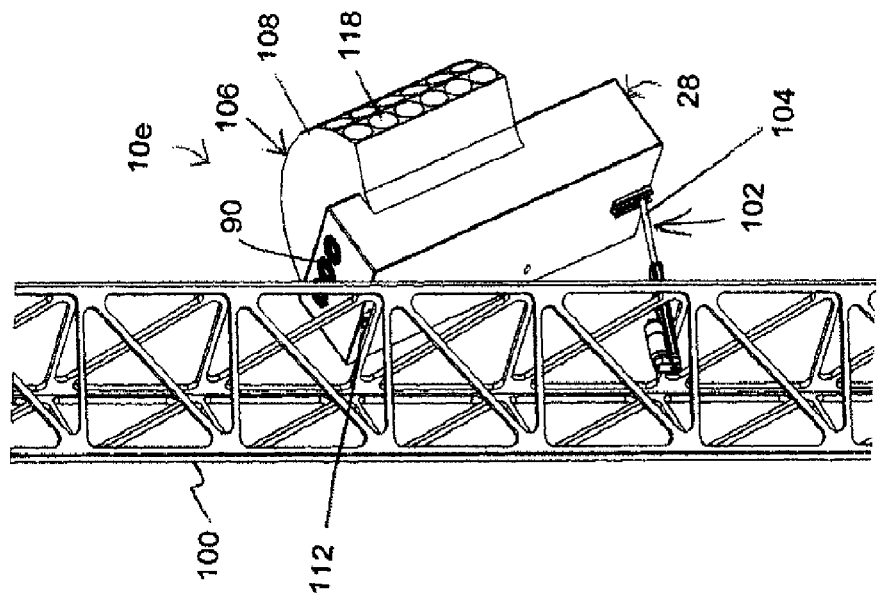
FIG. 11 is a rear perspective view of the thermal transpiration generator system of FIG. 10, wherein the thermal transpiration generator system is mounted to a tower and tilted and/or turned toward the sun depending on the direction of the sun for improved efficiency.
Figure 10:
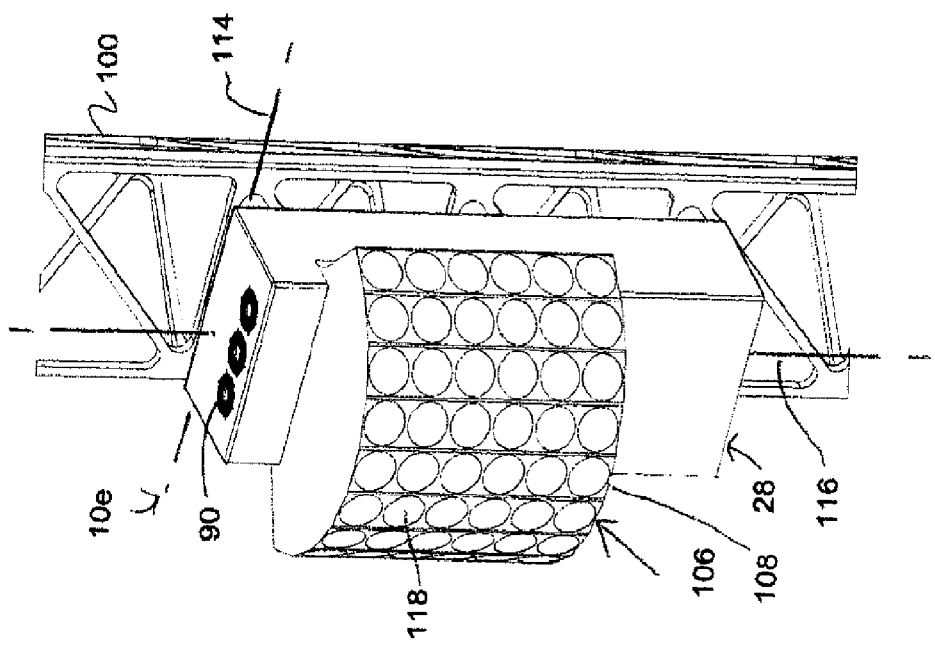
FIG. 10 is a front perspective view of a thermal transpiration generator system according to a sixth embodiment of the present invention.
Figure 13:
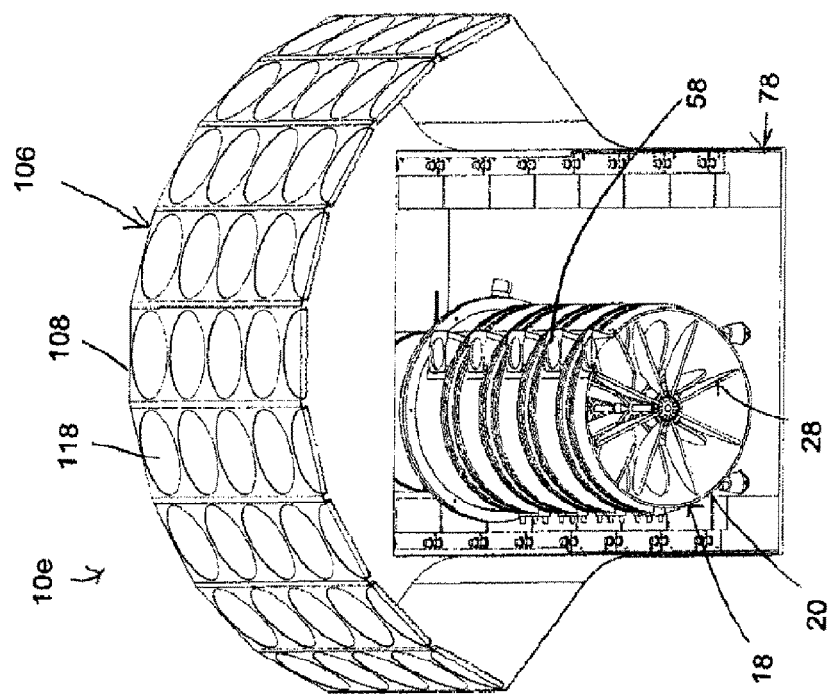
FIG. 13 is another enlarged perspective view, in cross-section, of the thermal transpiration generator system of FIGS. 10 and 11, similar to FIG. 12.
Figure 12:
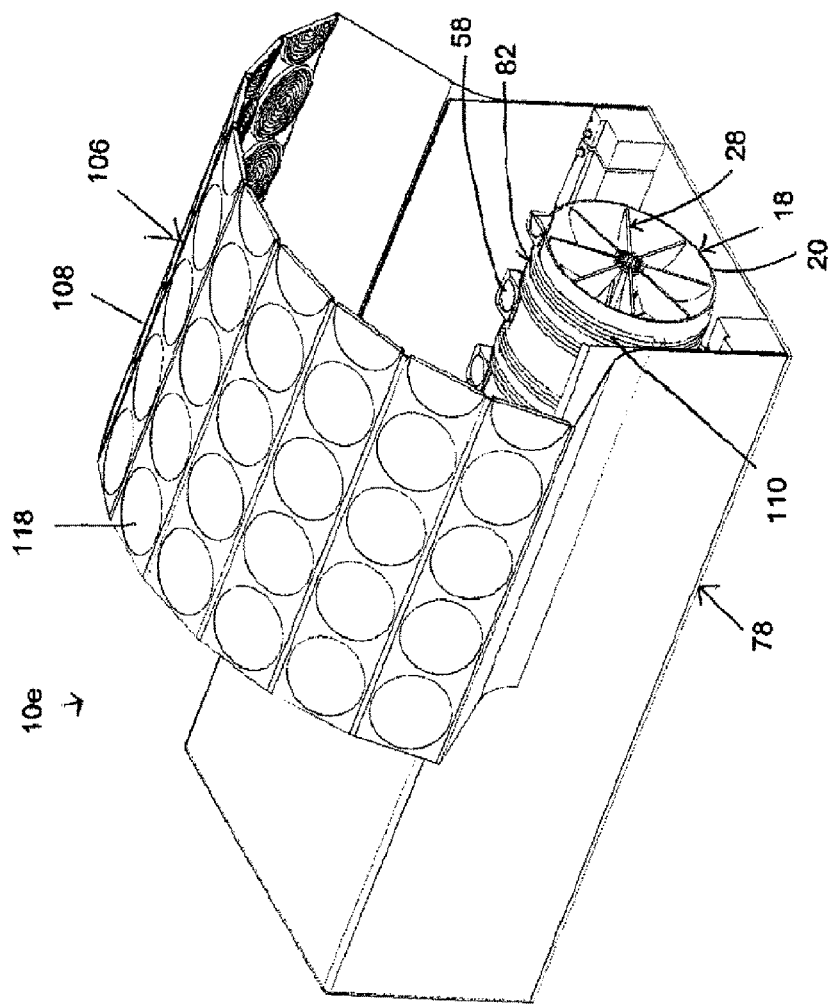
FIG. 12 is an enlarged perspective view, in cross-section, of the thermal transpiration generator system of FIGS. 10 and 11, showing a radius array of Fresnel lenses focusing their respective energy from the sun on a secondary receiving lens that will redirect the accumulated of the suns energy on a particular vane in a particular set of vanes attached to the shaft of the transpiration generator.
Figure 17:
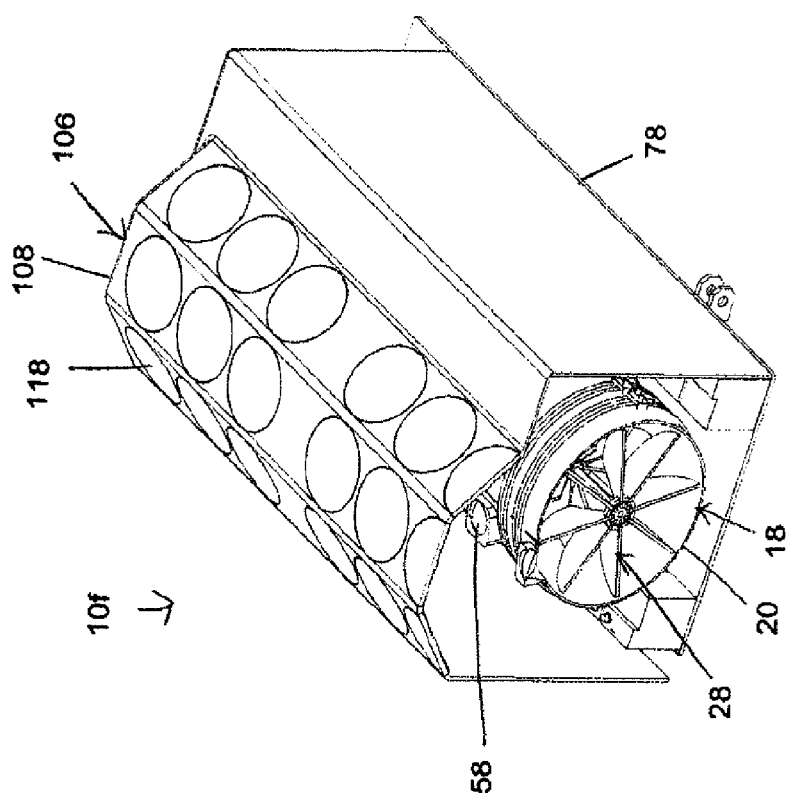
FIG. 17 is an enlarged perspective view of the thermal transpiration generator of FIG. 16.
Figure 16:
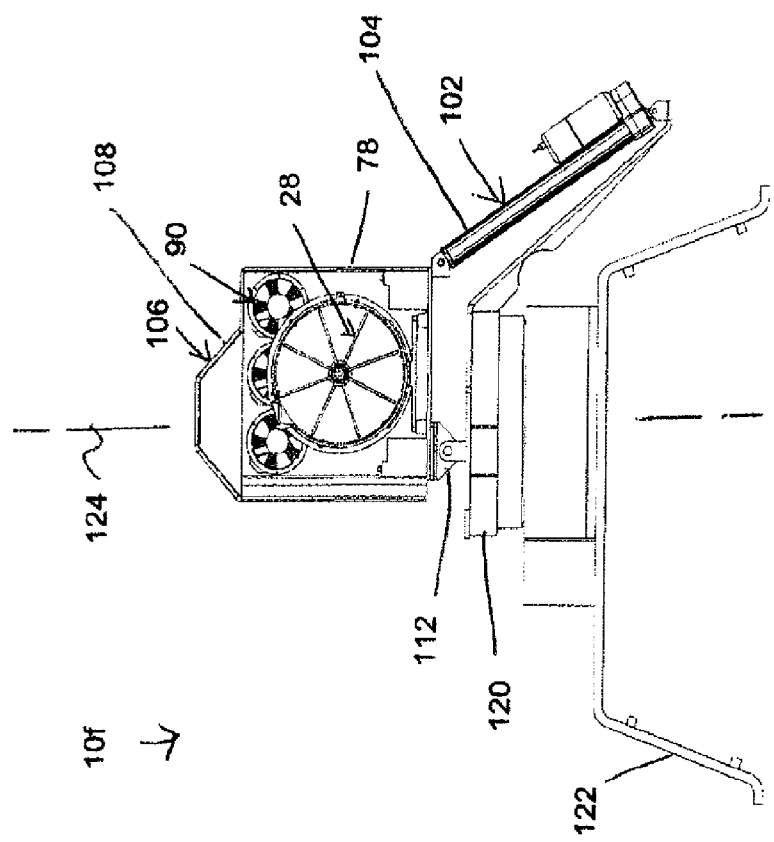
FIG. 16 is an end elevational view of the thermal transpiration generator system of FIGS. 14 and 15, but wherein the thermal transpiration generator is shown in cross-section and is not tilted by the lift cylinder.
Figure 18:
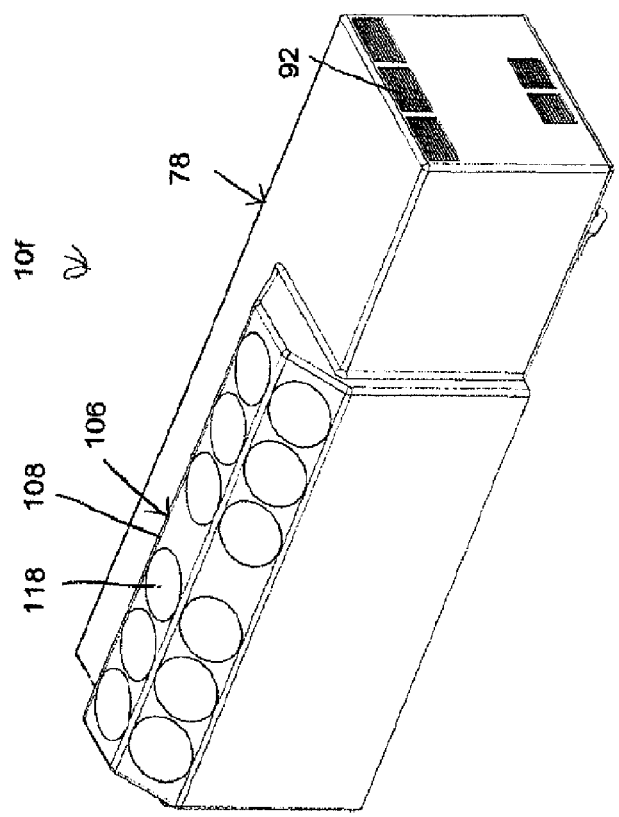
FIG. 18 is an enlarged perspective view of the thermal transpiration generator of FIGS. 14 to 16 showing an end with air vents.
Figure 19:
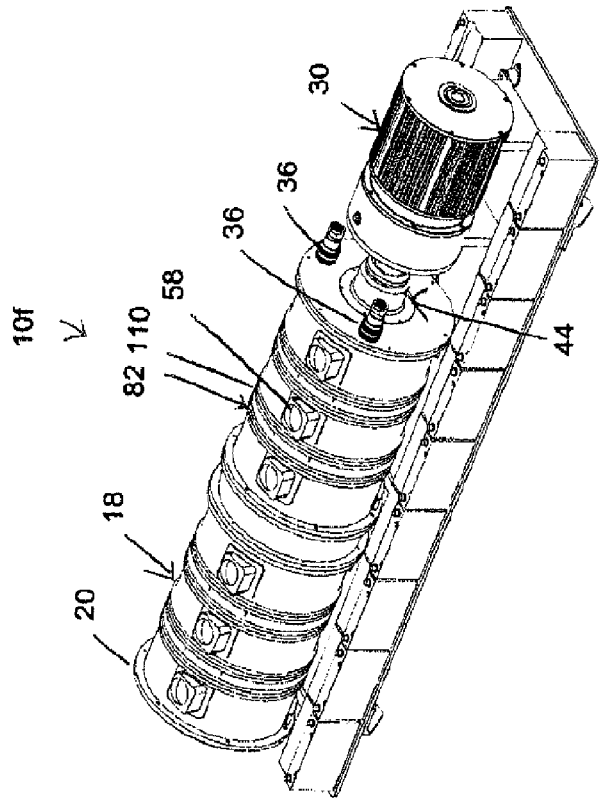
FIG. 19 is an enlarged perspective view of the thermal transpiration generator of FIGS. 14 to 16 similar to FIG. 18 but with a portion of the housing removed for clarity.
Figure 22:
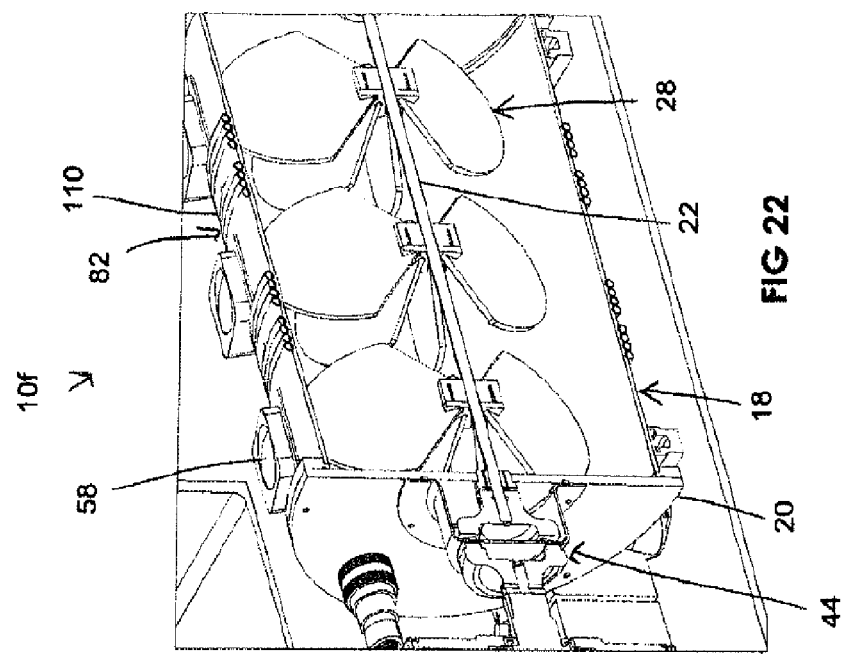
FIG. 22 is a an enlarged, fragmented perspective view of a portion of the thermal transpiration generator of FIG. 21, showing the vanes, the secondary receiving lenses, the cooling bands, the shaft, and the electric generator coupling.
Figure 20:
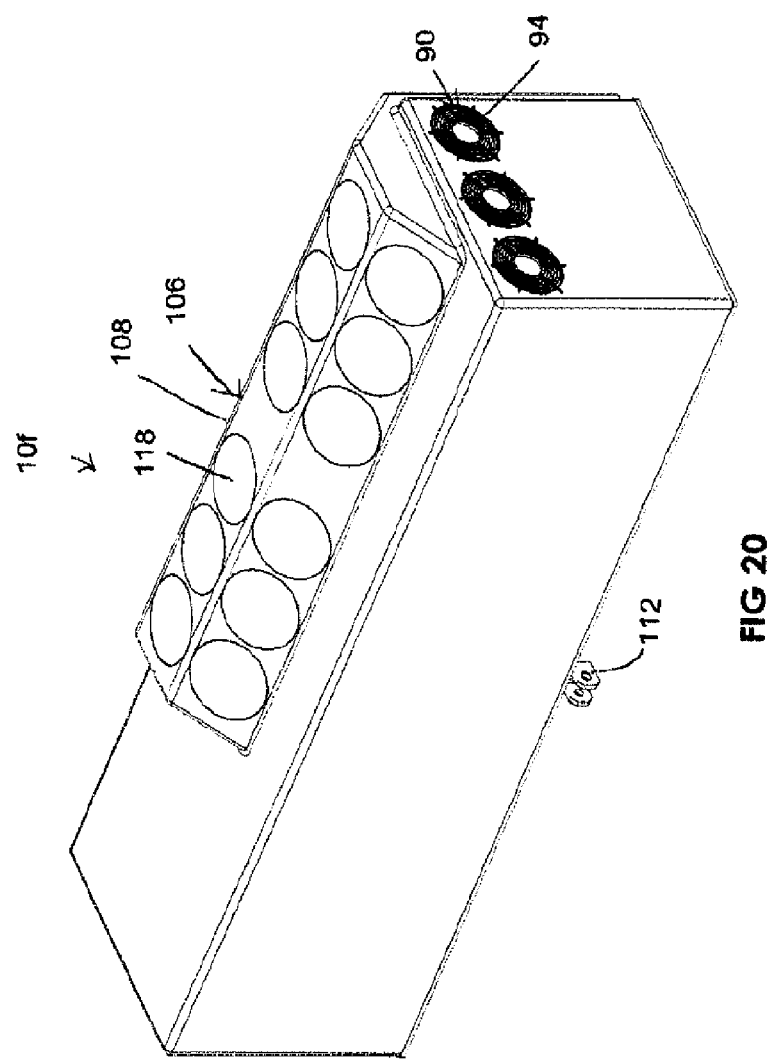
FIG. 20 is an enlarged perspective view of the thermal transpiration generator of FIGS. 14 to 16 similar to FIG. 18 but showing an end with exhaust fans.
Figure 21:
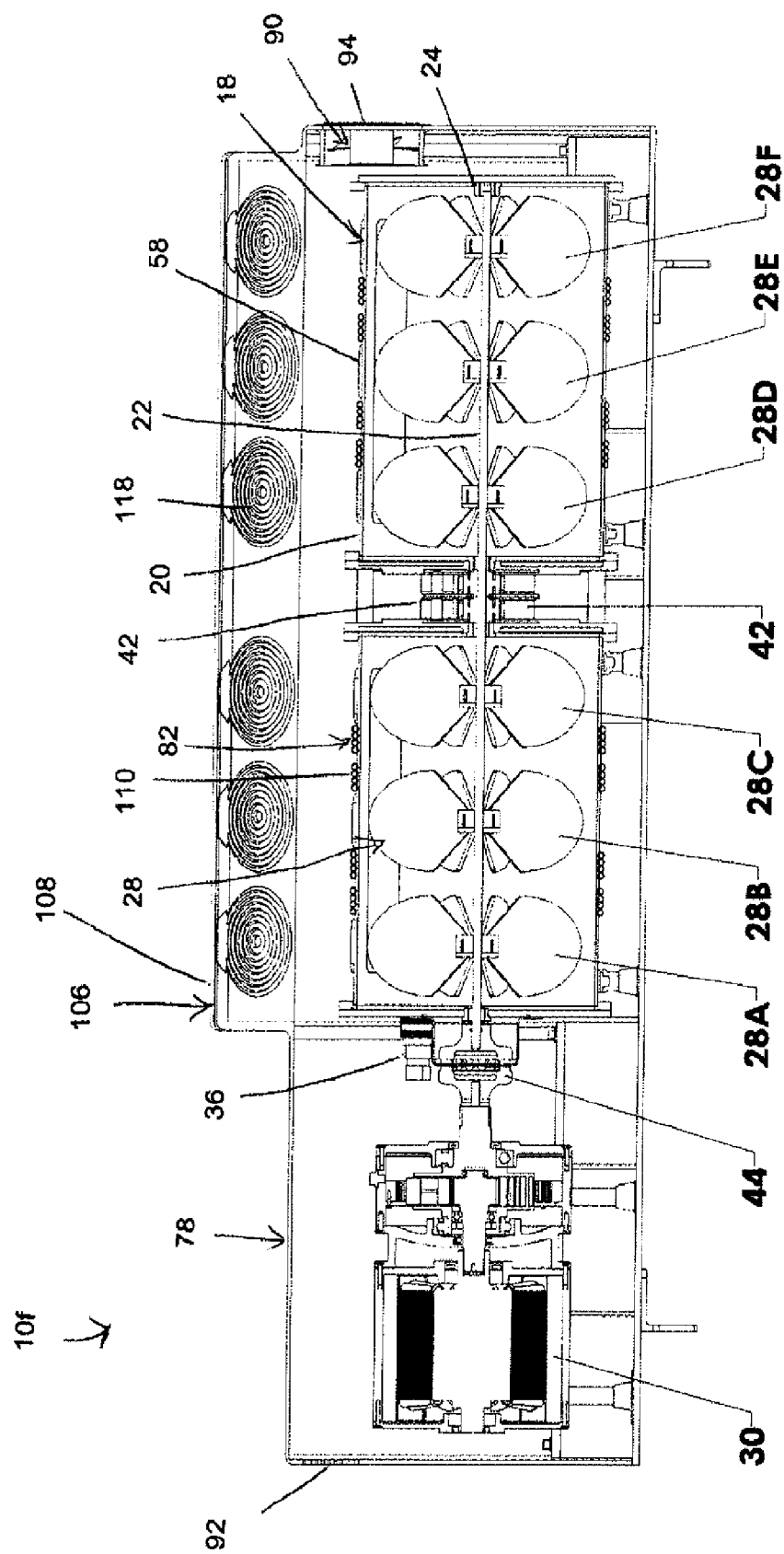
FIG. 21 is an enlarged cross-sectional view of the thermal transpiration generator of FIG. 20.
Figure 24:
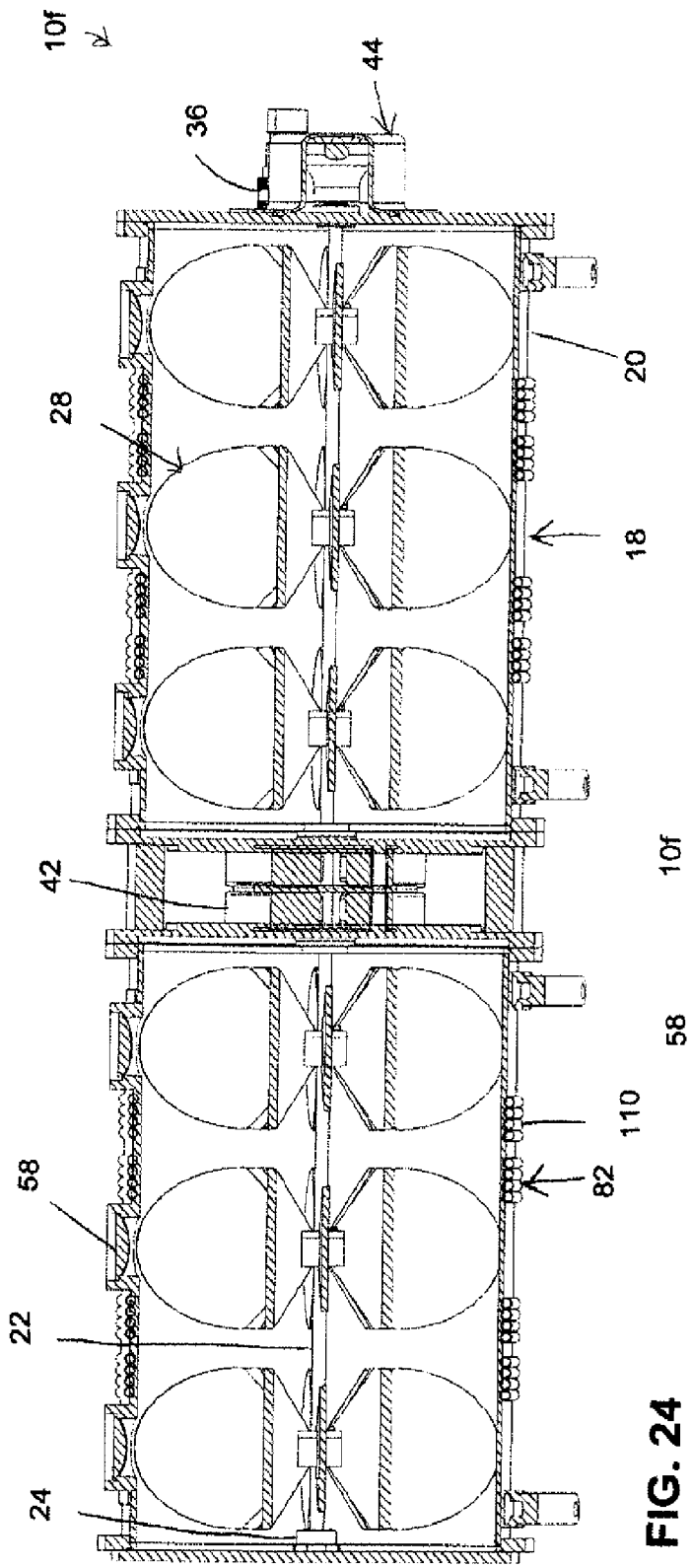
FIG. 24 is a cross-sectional view of the vacuum-sealed container of FIG. 23, showing centrally located flywheel between sets of vanes, and the secondary receiving lenses and the cooling bands.
Figure 23:
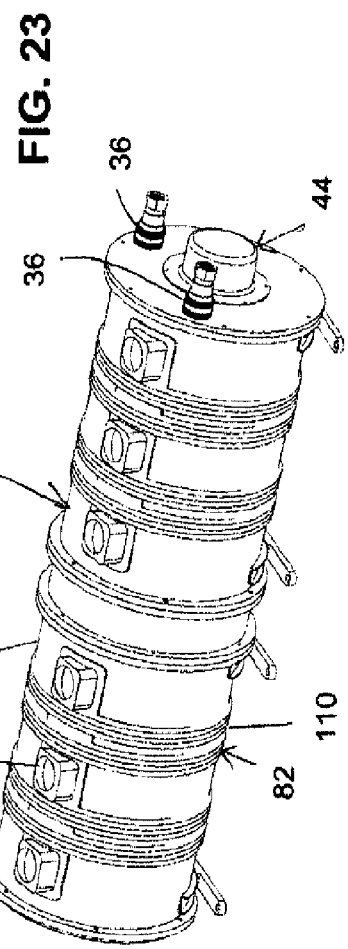
FIG. 23 is a perspective view of the vacuum-sealed container of thermal transpiration generator of FIGS. 14 to 22.

FIG. 9 shows a thermal transpiration generator system 10d according to a fifth embodiment of the present invention. This thermal transpiration generator system 10d is substantially the same as the thermal transpiration generator system 10b described above according to the third embodiment of the present invention except that the thermal transpiration generator 18 is secured to the front of the parabolic dish 12 near the focal point of the parabolic dish 12 and directly receives the solar energy from the reflective surface 96 of the parabolic dish 12. This fifth embodiment of the thermal transpiration generator system 10d illustrates that the thermal transpiration generator 18 can alternatively have other suitable locations.

FIGS. 10 to 13 show a thermal transpiration generator system 10e according to a sixth embodiment of the present invention. The illustrated thermal transpiration generator system 10e is substantially the same as the above-described embodiments except that: (1) the thermal transpiration generator system 10e is mounted to a tower or like vertical structure 100 by a sun-tracking system 102 that includes a lift or tilt actuator 104; (2) the light energy collector system 106 includes a radius array of lenses 108, and (3) the cooling system 82 of the thermal transpiration generator 18 is in the form of cooling bands 110 encircling the vacuum-sealed container 20 to cool the interior space 34 of the vacuum-sealed container 20. Thus, the thermal transpiration generator system 10e according to a sixth embodiment illustrates that: (1) the a sun-tracking system 102 can be in suitable forms other than the tracking system of the parabolic dish 12; (2) the light energy collector system 106 can be in suitable forms other than the parabolic dish 12; and (3) the cooling system 82 can be in forms other than the pump and radiator 84, 86.

The illustrated thermal transpiration generator system 10e is mounted to the tower 100 such as, for example, a cell phone tower, with the thermal transpiration generator 18 in a substantially vertical orientation, wherein the longitudinal axis of the rotatable shaft 22 is substantially vertical when the thermal transpiration generator 18 is not tilted by the sun-tracking system 102. The illustrated sun tracking system 102 selectively tilts the thermal transpiration generator 18 toward the sun depending on the direction of the sun for improved efficiency. The illustrated lift or tilt actuator 104 is a linear actuator extending between the tower 100 and the lower end of the outer housing 78. When the linear actuator 104 is retracted, the thermal transpiration generator 18 in a substantially vertical orientation (best seen in FIG. 10). When the linear actuator 104 extends, the thermal transpiration generator 18 pivots about a pivot connection 112 located between the tower 100 and the upper end of the outer housing 78. The illustrated pivot connection 112 has a horizontally extending pivot axis 114 so that the thermal transpiration generator 18 is at an acute from vertical (best seen in FIG. 11). The illustrated thermal transpiration generator 18 is oriented so that the pivot axis 114 is perpendicular to the longitudinal or rotational axis 116 of the rotatable shaft 22.

The illustrated light energy collection system 106 includes the radius array of lenses 108 that focus their respective light energy from the sun onto the receiving lenses 58. The receiving lenses 58 then focus the accumulated light energy onto the associated sets of vanes 28 attached to the rotatable shaft 22. The illustrated radius array 108 is configured to close an opening in the outer housing 78 but can alternatively be configured in any other suitable manner. The illustrated radius array 108 includes a plurality of parallel rows of collecting lenses 118 with each row associated with one of the receiving lenses 58. Thus, the illustrated embodiment has six rows of collecting lenses 118. Each row of collecting lenses 118 is on a curved path or radius about the associated receiving lens 58 so that the collecting lenses 118 of the row each focus the light energy onto the receiving lens 58. The illustrated rows each have nine collecting lenses 118 but any other suitable quantity of collecting lenses 118 can alternatively be utilized. The illustrated collecting lenses 118 are Fresnel lenses but any other suitable type of lens can alternatively be utilized. It is noted that the light energy collecting system can alternatively have any other suitable configuration.

The illustrated cooling system 82 includes the cooling bands 110 encircling the vacuum-sealed container 20 to cool the interior space 34 of the vacuum-sealed container 20. Cooling fluid can be circulated through internal passages within the cooling bands 110 in any suitable manner. The illustrated cooling system 82 includes six of the cooling bands 110 between each of the adjacent sets of vanes 28 but any other suitable quantity and/or configuration can alternatively be utilized. It is noted that the light energy collecting system 106 can alternatively have any other suitable configuration. It is noted that because cooling liquid is not flowing within the outer housing 78 as in an above-described embodiment, the control system 48 can be located within the outer housing 78, outside the outer housing 78 or a combination of the. Additionally, at least one battery can be located within the outer housing 78 for either storage of electrical energy storage from the generator 30, an alternative power source for controlling the system 10e, or both.

FIGS. 14 to 24 show a thermal transpiration generator system 10f according to a seventh embodiment of the present invention. The illustrated thermal transpiration generator system 10f is substantially the same as the above-described sixth embodiment except that the thermal transpiration generator system 10f is mounted to a sun-tracking system 102 that is configured as three-axis rotation and elevation device that includes a rotation drive or turntable 120 with the lift or tilt actuator 104. Thus, the thermal transpiration generator system 10f according to a seventh embodiment illustrates that the a sun-tracking system 102 can be in suitable forms other than the tracking system of the parabolic dish 12 and the vertical structure 100 with the lift or tilt actuator 104.

The illustrated thermal transpiration generator system 10f is mounted to the rotational drive 120 with the thermal transpiration generator 18 in a substantially horizontal orientation, wherein the longitudinal axis 116 of the rotatable shaft 22 is substantially horizontal and the radius array 108 facing straight up when the thermal transpiration generator 18 is not tilted by the lift or tilt actuator 104. The illustrated rotational drive 120 selectively rotates the thermal transpiration generator 18 and the illustrated linear actuator 104 selectively tilts the thermal transpiration generator 18 toward the sun depending on the direction of the sun for improved efficiency. The illustrated rotational drive or turntable 120 is supported on a stationary base 122 and rotates relative to the base 122 about a central vertically-extending rotational axis 124. The rotational drive 120 rotates at least substantially about 180 degrees and preferably about 360 degrees. The illustrated linear actuator 104 extends between the turntable 120 and the lower side edge of the outer housing 78. When the linear actuator 104 is retracted, the radius array 108 is facing upward in a substantially vertical direction (best seen in FIG. 16). When the linear actuator 104 is extended, the thermal transpiration generator 18 pivots about a pivot connection 112 between the turntable 120 and the opposite side edge of the outer housing 78 having a horizontally-extending pivot axis 114 so that the radius array 108 is facing a direction at least at an acute from vertical (best seen in FIG. 15) and preferably facing about 90 degrees from vertical (which is horizontal) when the linear actuator 104 is fully extended. The illustrated thermal transpiration generator 18 is oriented so that the longitudinal or rotational axis 116 of the rotatable shaft 22 is parallel to the pivot axis 114. Thus, the thermal transpiration generator 18 remains in a horizontal orientation throughout the pivoting motion. It is noted that the sun tracking system 102 can alternatively have any other suitable configuration.

Figure 26:
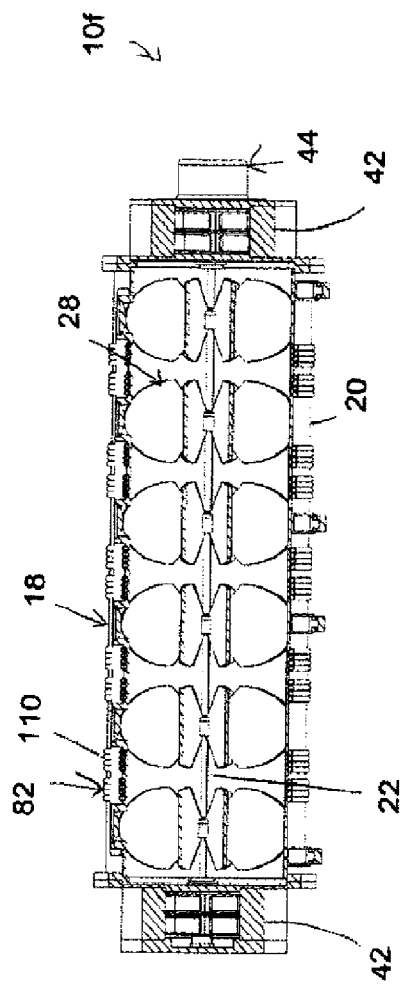
FIG. 26 is a cross-sectional view of the vacuum-sealed container of FIG. 25.
Figure 25:
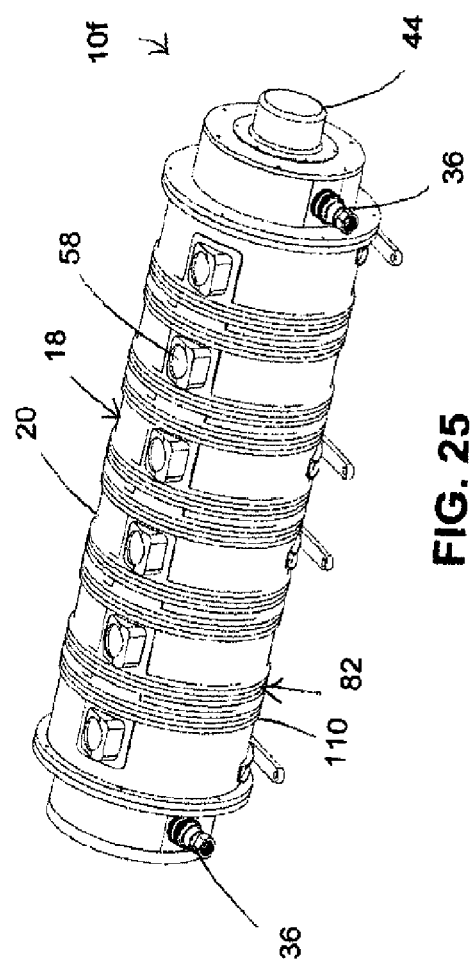
FIG. 25 is a perspective view of a variation of the vacuum-sealed container of thermal transpiration generator of FIGS. 14 to 22, showing flywheels located at each end of evenly distributed sets of vanes, and the secondary receiving lenses and the cooling bands.
Figure 30:
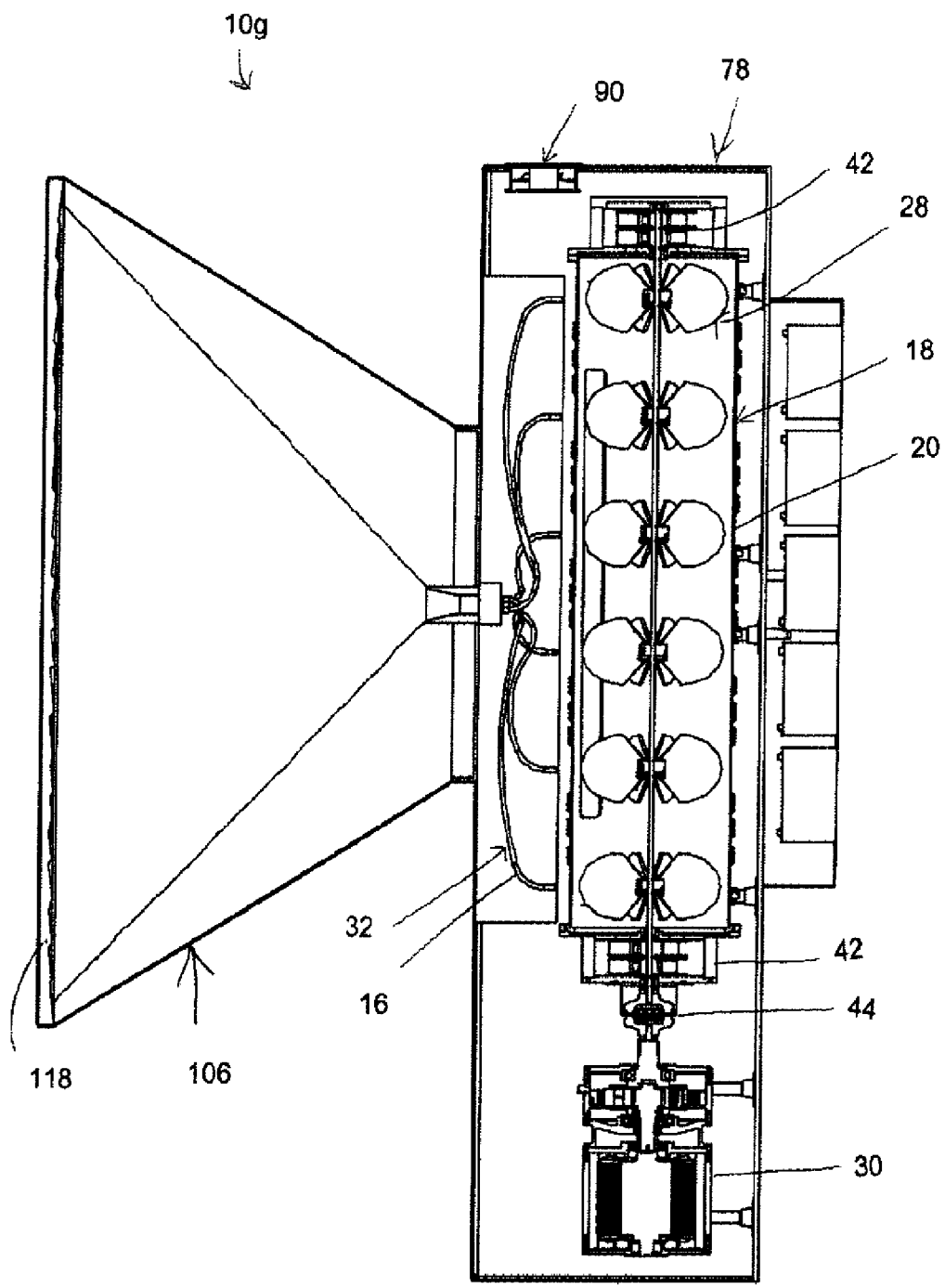
FIG. 30 is an enlarged cross sectional view of the thermal transpiration generator system of FIGS. 27 to 29.
Figure 31:
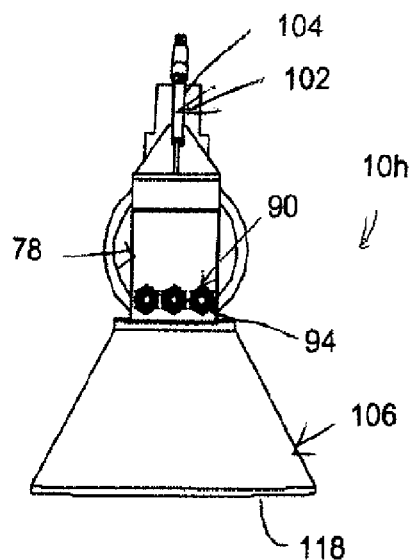
FIG. 31 is a top plan view of a thermal transpiration generator system according to a ninth embodiment of the present invention, showing a very large Fresnel lens used to focus sunlight onto a light distribution system, which then focuses the light energy onto the respective vanes, and the thermal transpiration generator is vertically mounted on a rotational drive and elevating lift cylinder that optimally presents the Fresnel lens to the sun by following the path of the sun.
Figure 32:
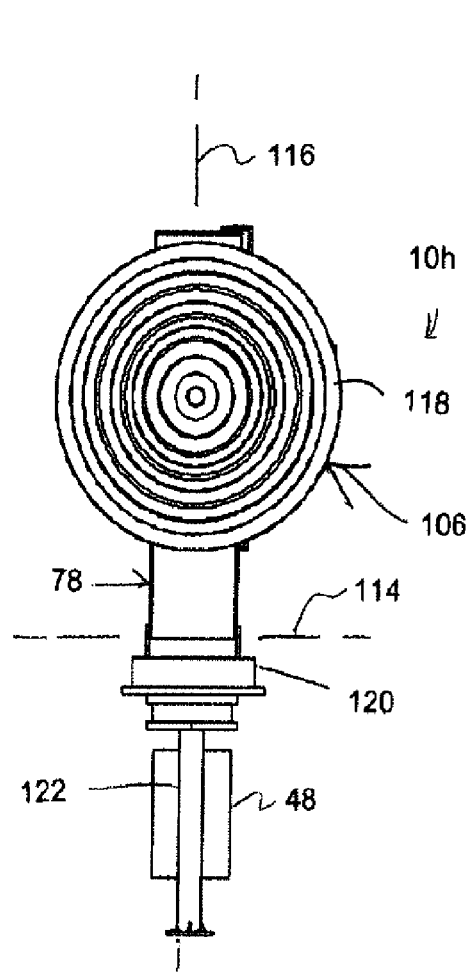
FIG. 32 is a front elevational view of the thermal transpiration generator system of FIG. 31.
Figure 33:
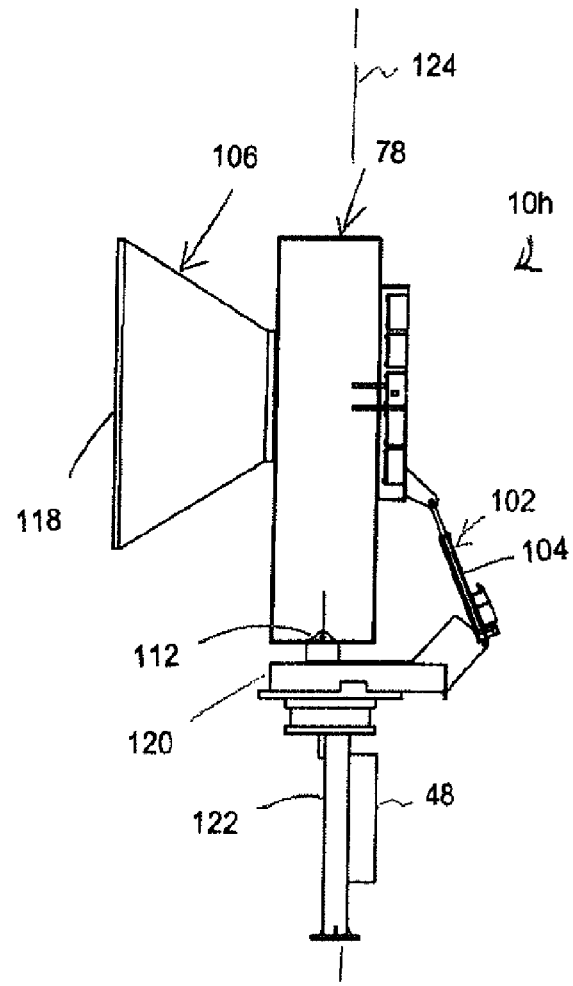
FIG. 33 is a left side elevational view of the thermal transpiration generator system of FIGS. 31 and 32.
Figure 34:
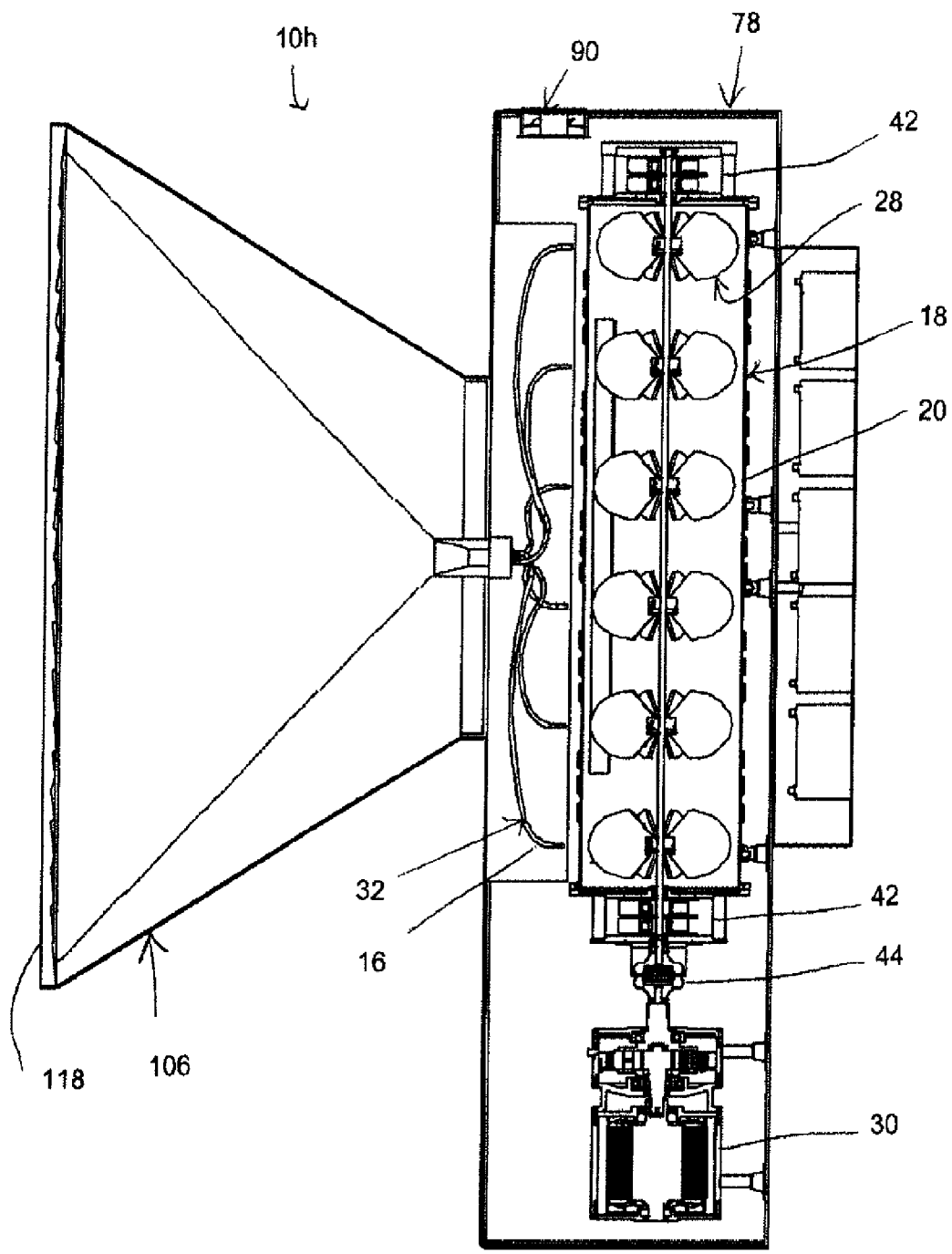
FIG. 34 is an enlarged cross sectional view of the thermal transpiration generator system of FIGS. 31 to 33.

FIGS. 25 and 26 show an alternative variation of the thermal transpiration generator 18 of the above-described thermal transpiration generator system 19f, wherein there are two flywheels 42 with one located at each end of the rotating shaft 22 outward of the evenly spaced-apart sets of vanes 28. It is noted that there can alternatively be any other suitable quantity and/or configuration for the flywheels 42.

FIGS. 27 to 30 show a thermal transpiration generator system 10g according to an eighth embodiment of the present invention. The illustrated thermal transpiration generator system 10fg is substantially the same as the above-described seventh embodiment except that the light energy collector system 106 is in the form of large single collecting lens 118 for all of the receiving lenses 58. Thus, the thermal transpiration generator system 10f according to the eighth embodiment illustrates that the light energy collecting system 106 can be in suitable forms other than the parabolic dish 12 and the radius array of lenses 108. The illustrated collecting lens 118 is a Fresnel lens but any other suitable lens can alternatively be utilized. light energy distribution system 32 is provided that equally directs the light energy from the collecting lens 118 to the receiving lenses 58. The illustrated light energy distribution system 32 includes a plurality of light carrier tubes or conduits 16 but it is noted that any other suitable configuration can alternatively be utilized.

FIGS. 31 to 34 show a thermal transpiration generator system 10h according to a ninth embodiment of the present invention. The illustrated thermal transpiration generator system 10h is substantially the same as the above-described eighth embodiment except that the thermal transpiration generator system 10h is mounted to the sun-tracking system 102 that includes rotation drive or turntable 120 with the lift or tilt actuator 104 in a different orientation. The illustrated thermal transpiration generator 18 is oriented so that the pivot axis 114 is perpendicular to the longitudinal or rotational axis 116 of the rotatable shaft 22. The illustrated linear actuator 104 extends between the turntable 120 and a side edge of the outer housing 78. The pivot connection 112 is located between the turntable 120 and an end of the outer housing 78. Thus, the thermal transpiration generator 18 pivots between a vertical orientation and a horizontal orientation as the linear actuator 104 extends and retracts. It is noted that the sun tracking system 102 can alternatively have any other suitable configuration.

Any of the features or attributes of the above described embodiments and variations can be used in combination with any of the other features and attributes of the above described embodiments and variations as desired.

The illustrated systems according to the present invention may be used to power a home, charge car batteries, act as a power source during power outages, provide power to electric companies, provide power at remote locations where power lines currently don't exist, power cell towers, and road signs. The illustrated systems can be taken to outer space and power a remote work station located in space or on another planetary body (moon, mars, etc.) and may be used for colonizing people to those worlds.

It is apparent from the above detailed description of preferred embodiments of the present invention, that the thermal transpiration generator systems according to the present invention may provide the cheapest, cleanest, free energy available to mankind. The present invention may utilize the sun's energy and turn mechanical energy into power output and may require much less space than what solar panels currently require and at a much less overall cost. The present invention may utilize the sun to generate its power and in-turn this power is utilized in generating auxiliary power for multiple uses. More homes may utilize the present invention compared to solar panels due to the space constraints. The present invention may utilize the free energy of the sun to generate power versus some of the gas powered back-up generators. This generator may be less expensive to manufacture than solar panels (amount of power versus overall cost). The design of this generator may outlast (life of product) over other power sources currently available.

What is claimed is:

1. A thermal transpiration generator system comprising, in combination:
    a thermal transpiration generator comprising:
        a vacuum-sealed container;
        a rotatable shaft disposed within the vacuum-sealed container;
        bearings supporting the rotatable shaft within the vacuum-sealed container;
        a first set of at least two vanes located in the vacuum-sealed container and secured to the rotatable shaft for rotation therewith;
        a second set of at least two vanes located in the vacuum-sealed container and secured to the rotatable shaft for rotation therewith and spaced-apart from the first set of at least two vanes along the length of the rotatable shaft;
        wherein each of the vanes has a light reflecting side and an opposite light absorbing side;
        a first receiving lens for focusing energy on the light absorbing sides of the first set of at least two vanes; and
        a second receiving lens for focusing energy on the light absorbing sides of the second set of at least two vanes;
    an electric generator operatively coupled to the rotatable shaft to be driven by rotation of the rotatable shaft;
    a row of first collecting lenses located on an arc about the first receiving lens for focusing light energy on the first receiving lens; and
    a row of second collecting lenses located on an arc about the second receiving lens for focusing light energy on the second receiving lens,
    wherein the rows of first and second collecting lenses are parallel and concentric to form an array of the first and second collecting lenses.

2. The thermal transpiration generator system according to claim 1, further comprising at least one high RPM flywheel secured to the rotatable shaft for rotation therewith.

3. The thermal transpiration generator system according to claim 2, wherein the at least one high RPM flywheel is located within the vacuum-sealed container.

4. The thermal transpiration generator system according to claim 2, wherein the at least one high RPM flywheel is located outside the vacuum-sealed container.

5. The thermal transpiration generator system according to claim 1, wherein the electric generator is located outside the vacuum-sealed container and is coupled to the rotatable shaft located within the vacuum-sealed container with a magnetic coupler operating through a wall of the vacuum sealed container so that the electric generator is selectively rotated by rotation of the rotatable shaft.

6. The thermal transpiration generator system according to claim 1, wherein the electric generator is a low torque and high RPM generator.

7. The thermal transpiration generator system according to claim 1, wherein the vacuum-sealed container is hermetically sealed and wherein no electrical components are located within the vacuum-sealed container.

8. The thermal transpiration generator system according to claim 1, wherein the bearings are frictionless bearings.

9. The thermal transpiration generator system according to claim 1, further comprising an outer housing located about the vacuum-sealed container and the electric generator, and wherein the rows of first and second collecting lenses are located outside the outer housing and are at least partly supported by the outer housing.

10. A thermal transpiration generator system comprising, in combination:
a thermal transpiration generator comprising:
a vacuum-sealed container;
a rotatable shaft disposed within the vacuum-sealed container;
bearings supporting the rotatable shaft within the vacuum-sealed container;
a first set of at least two vanes located within the vacuum-sealed container and secured to the rotatable shaft for rotation therewith;
a second set of at least two vanes located within the vacuum-sealed container and secured to the rotatable shaft for rotation therewith and spaced-apart from the first set of at least two vanes along the length of the rotatable shaft;
wherein each of the vanes has a light reflecting side and an opposite light absorbing side;
a first receiving lens for focusing energy on the light absorbing sides of the first set of at least two vanes;
a second receiving lens for focusing energy on the light absorbing sides of the second set of at least two vanes; and
at least one high RPM flywheel secured to the rotatable shaft for rotation therewith;
an electric generator located outside the vacuum-sealed container and coupled to the rotatable shaft located inside the vacuum-sealed container with a magnetic coupler operating through a wall of the vacuum sealed container so that the electric generator is selectively rotated by rotation of the rotatable shaft;
a row of first collecting lenses located on an arc about the first receiving lens for focusing light energy on the first receiving lens; and
a row of second collecting lenses located on an arc about the second receiving lens for focusing light energy on the second receiving lens,
wherein the rows of first and second collecting lenses are parallel and concentric to form an array of the first and second collecting lenses.

11. The thermal transpiration generator system according to claim 10, wherein the at least one high RPM flywheel is located within the vacuum-sealed container along the length of the shaft between the first and second sets of at least two vanes.

12. The thermal transpiration generator system according to claim 10, wherein the at least one high RPM flywheel is located within the vacuum-sealed container.

13. The thermal transpiration generator system according to claim 10, wherein the electric generator is a low torque and high RPM generator.

14. The thermal transpiration generator system according to claim 10, wherein the vacuum-sealed container is hermetically sealed and wherein no electrical components are located within the vacuum-sealed container.

15. The thermal transpiration generator system according to claim 10, wherein the bearings are frictionless bearings.

16. The thermal transpiration generator system according to claim 10, further comprising an outer housing located about the vacuum-sealed container and the electric generator.

17. The thermal transpiration generator system according to claim 10, wherein the magnetic coupler is engaged and disengaged by a control system at least partly based on a rotational speed of the rotatable shaft located within the vacuum sealed-container.

18. A tower-mounted thermal transpiration generator system comprising, in combination:
a vertically-extending tower;
a thermal transpiration generator comprising:
a vacuum-sealed container;
a rotatable shaft disposed within the vacuum-sealed container;
bearings supporting the rotatable shaft within the vacuum-sealed container;
a first set of at least two vanes located inside the vacuum-sealed container and secured to the rotatable shaft for rotation therewith;
a second set of at least two vanes located inside the vacuum-sealed container and secured to the rotatable shaft for rotation therewith and spaced-apart from the first set of at least two vanes along the length of the rotatable shaft;
wherein each of the vanes has a light reflecting side and an opposite light absorbing side;
a first receiving lens located to focus energy on the light absorbing sides of the first set of at least two vanes; and
a second receiving lens located to focus energy on the light absorbing sides of the second set of at least two vanes;
an electric generator operatively coupled to the rotatable shaft to be driven by rotation of the rotatable shaft;
a row of first collecting lenses located on an arc about the first receiving lens for focusing light energy on the first receiving lens;
a row of second collecting lenses located on an arc about the second receiving lens for focusing light energy on the second receiving lens;
wherein the rows of first and second collecting lenses are parallel and concentric to form an array of the first and second collecting lenses;
an outer housing located about the vacuum-sealed container and the electric generator and at least partly supporting the array of the first and second collecting lenses; and
wherein the thermal transpiration generator, the electric generator, and the outer housing are mounted to the vertically-extending tower.

19. The tower-mounted thermal transpiration generator system according to claim 18, further comprising at least one battery within the outer housing for at least one of energy storage and alternative control power.

20. The tower-mounted thermal transpiration generator system according to claim 18, wherein the thermal transpiration generator is mounted to the tower with a vertical orientation with the rotatable shaft vertically extending, and further comprising a linear actuator operably connected to a lower end of the outer housing so that the lower end of the outer housing can be selectively moved away and toward the tower to adjust the inclination of the thermal transpiration generator between vertical and an acute angle from vertical.

21. The tower-mounted thermal transpiration generator system according to claim 18, wherein the vertically-extending tower is a cell tower.

\* \* \* \* \*